(12) United States Patent
Lim et al.

(10) Patent No.: US 12,562,945 B2
(45) Date of Patent: Feb. 24, 2026

(54) ELECTRONIC DEVICE AND METHOD FOR PERFORMING MODULATION COMPRESSION OF DATA TRANSMITTED THROUGH USER PLANE MESSAGE IN FRONTHAUL INTERFACE

(71) Applicant: SAMSUNG ELECTRONICS CO., LTD., Suwon-si (KR)

(72) Inventors: Hyoungjin Lim, Suwon-si (KR); Seijoon Shim, Suwon-si (KR); Jongho Oh, Suwon-si (KR); Hyeri Bang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 18/379,929

(22) Filed: Oct. 13, 2023

(65) Prior Publication Data

US 2024/0223420 A1 Jul. 4, 2024

Related U.S. Application Data

(63) Continuation of application No. PCT/KR2023/014715, filed on Sep. 25, 2023.

(30) Foreign Application Priority Data

| Dec. 20, 2022 | (KR) | ........................ | 10-2022-0179786 |
| Jan. 4, 2023 | (KR) | ........................ | 10-2023-0001476 |
| Jan. 12, 2023 | (KR) | ........................ | 10-2023-0004773 |

(51) Int. Cl.
| *H04L 27/20* | (2006.01) |
| *H04L 27/00* | (2006.01) |
(Continued)

(52) U.S. Cl.
CPC .......... *H04L 27/20* (2013.01); *H04L 27/0008* (2013.01); *H04L 27/22* (2013.01); *H04L 27/36* (2013.01); *H04L 27/38* (2013.01)

(58) Field of Classification Search
CPC ..... H04L 27/0008; H04L 27/20; H04L 27/22; H04L 27/18; H04L 27/34; H04L 27/36; H04L 27/38
See application file for complete search history.

(56) References Cited

U.S. PATENT DOCUMENTS

| 8,249,190 B2 | 8/2012 | Seller |
| 8,441,979 B2 | 5/2013 | Imaeda et al. |
(Continued)

FOREIGN PATENT DOCUMENTS

| KR | 102226464 B1 | 3/2021 |
| KR | 10-2022-0037305 A | 3/2022 |
(Continued)

OTHER PUBLICATIONS

ETSI TS 103 859, V7.0.2, Publicly Available Specification (PAS); O-RAN Fronthaul Control, User and Synchronization Plane, Specification v07.02; (O-RAN-WG4.CUS.0-v07.02), Technical Specification, Sep. 8, 2022, 318 pages.
(Continued)

*Primary Examiner* — Betsy Deppe
(74) *Attorney, Agent, or Firm* — Sughrue Mion, PLLC

(57) ABSTRACT

According to an embodiment, a method performed by a distributed unit (DU) may comprise generating, based on a modulation compression scheme, a modulation value corresponding to information bits. The method may comprise generating, based on a shifting operation corresponding to the modulation compression scheme, user plane (U-plane) data corresponding to the modulation value. The method may comprise transmitting, to a radio unit (RU) through a
(Continued)

fronthaul interface, a U-plane message comprising the generated U-plane data. In a case of binary phase shift keying (BPSK), the modulation compression scheme may be set to perform the shifting operation based on a designated first equation. In a case of non-BPSK, the modulation compression scheme may be set to perform the shifting operation based on a designated second equation.

16 Claims, 21 Drawing Sheets

(51) Int. Cl.
H04L 27/22 (2006.01)
H04L 27/36 (2006.01)
H04L 27/38 (2006.01)

(56) References Cited

U.S. PATENT DOCUMENTS

| | | | | |
|---|---|---|---|---|
| 8,848,830 | B2 | 9/2014 | Clevorn | |
| 9,049,084 | B1 | 6/2015 | Cope | |
| 10,517,029 | B2 | 12/2019 | Kim et al. | |
| 11,477,801 | B2 | 10/2022 | Lim et al. | |
| 11,546,193 | B2 * | 1/2023 | Hu | H04L 27/20 |
| 11,778,597 | B2 | 10/2023 | Shim et al. | |
| 2008/0021269 | A1 | 1/2008 | Tinkham et al. | |
| 2021/0058925 | A1 | 2/2021 | Shim et al. | |
| 2021/0352526 | A1 * | 11/2021 | Kim | H04L 27/36 |
| 2022/0210808 | A1 | 6/2022 | Rama Chandran | |
| 2023/0119851 | A1 | 4/2023 | Jang et al. | |
| 2023/0224118 | A1 | 7/2023 | Lim et al. | |
| 2023/0328712 | A1 | 10/2023 | Singh et al. | |
| 2024/0137912 | A1 | 4/2024 | Lim et al. | |

FOREIGN PATENT DOCUMENTS

| | | |
|---|---|---|
| WO | 2019/217391 A1 | 11/2019 |
| WO | 2021/261979 A1 | 12/2021 |
| WO | 2022/015659 A1 | 1/2022 |
| WO | 2022005709 A1 | 1/2022 |
| WO | 2022046980 A2 | 3/2022 |

OTHER PUBLICATIONS

O-RAN-WG4.CUS.0-v08.00, O-RAN Working Group 4 (Open Fronthaul Interfaces WG), Control, User and Synchronization Plane Specification, O-RAN Alliance, Technical Specification, Jun. 2023, 336 pages.

International Search Report (PCT/ISA/210) issued by the International Searching Authority on Jan. 11, 2024 in corresponding International Application No. PCT/KR2023/014715.

Written Opinion (PCT/ISA/237) issued by the International Searching Authority on Jan. 11, 2024 in corresponding International Application No. PCT/KR2023/014715.

3GPP TS 38.211, V18.0.0, 3rd Generation Partnership Project; Technical Specification Group Radio Access Network; NR; Physical channels and modulation, (Release 18), Sep. 2023, 159 pages.

3GPP TS 38.104, V18.2.0, 3rd Generation Partnership Project; Technical Specification Group Radio Access Network; NR; Base Station (BS) radio transmission and reception, (Release 18), Jun. 2023, 388 pages.

Communication dated Dec. 23, 2025, issued by the European Patent Office in European Application No. 23907314.1.

Lagen et al., "Modulation Compression in Next Generation RAN: Air Interface and Fronthaul Trade-offs", IEEE Communications Magazine, Feb. 17, 2021, pp. 89-96 (7 pages total).

\* cited by examiner

GENERATE MODULATION VALUE CORRESPONDING
TO INFORMATION BITS — 1010

GENERATE U-PLANE DATA CORRESPONDING
TO MODULATION VALUE — 1020

TRANSMIT U-PLANE MESSAGE INCLUDING GENERATED
U-PLANE DATA TO RU — 1030

RECEIVE U-PLANE MESSAGE INCLUDING
U-PLANE DATA FROM DU — 1110

OBTAIN MODULATION VALUE CORRESPONDING
TO U-PLANE DATA — 1120

ELECTRONIC DEVICE AND METHOD FOR PERFORMING MODULATION COMPRESSION OF DATA TRANSMITTED THROUGH USER PLANE MESSAGE IN FRONTHAUL INTERFACE

CROSS-REFERENCE TO RELATED APPLICATIONS

This application is a by-pass continuation application of International Application No. PCT/KR2023/014715, filed on Sep. 25, 2023, which is based on and claims priority to Korean Patent Application Nos. 10-2022-0179786, filed on Dec. 20, 2022, 10-2023-0001476, filed on Jan. 4, 2023, and 10-2023-0004773, filed on Jan. 12, 2023, in the Korean Intellectual Property Office, the disclosures of which are incorporated by reference herein their entireties.

BACKGROUND

1. Field

The disclosure relates to a fronthaul interface, which is defined for communication between a distributed unit (DU) and a radio unit (RU) of a base station in a wireless communication system. More specifically, the disclosure relates to an electronic device and a method for performing modulation compression of data transmitted through a user plane message in a fronthaul interface.

2. Description of Related Art

As transmission capacity increases in wireless communication systems, function split that functionally separates a base station is being applied. According to function split, the base station may be divided into the DU and the RU. The above-described information may be provided as related art for the purpose of helping to understand the disclosure. No claim or determination is raised as to whether any of the above-described information can be applied as a prior art related to the disclosure.

SUMMARY

According to an embodiment, a method performed by a distributed unit (DU) may comprise generating, based on a modulation compression scheme, a modulation value corresponding to information bits. The method may comprise generating, based on a shifting operation corresponding to the modulation compression scheme, user plane (U-plane) data corresponding to the modulation value. The method may comprise transmitting, to a radio unit (RU) through a fronthaul interface, a U-plane message comprising the generated U-plane data. In a case of binary phase shift keying (BPSK), the modulation compression scheme may be set to perform the shifting operation based on a designated first equation. In a case of non-BPSK, the modulation compression scheme may be set to perform the shifting operation based on a designated second equation.

According to an embodiment, an electronic device may comprise at least one transceiver comprising a fronthaul transceiver, and at least one processor coupled with the at least one transceiver. The at least one processor may be configured to generate, based on a modulation compression scheme, a modulation value corresponding to information bits. The at least one processor may be configured to generate, based on a shifting operation corresponding to the modulation compression scheme, user plane (U-plane) data corresponding to the modulation value. The at least one processor may be configured to transmit, to a radio unit (RU) through a fronthaul interface, a U-plane message including the generated U-plane data. In case of binary phase shift keying (BPSK), the modulation compression scheme may be set to perform the shifting operation based on a designated first equation. In case of non-BPSK, the modulation compression scheme may be set to perform the shifting operation based on a designated second equation.

According to an embodiment, a method performed by a radio unit (RU) may comprise receiving a user plane (U-plane) message including U-plane data from a distributed unit (DU) through a fronthaul interface. The method may comprise obtaining, based on shifting operation corresponding to a modulation compression scheme, a modulation value corresponding to U-plane data. In a case of binary phase shift keying (BPSK), the modulation compression scheme may be set to perform the shifting operation based on a designated first equation. In a case of non-BPSK, the modulation compression scheme may be set to perform the shifting operation based on a designated second equation.

According to an embodiment, an electronic may comprise at least one transceiver comprising a fronthaul transceiver, and at least one processor coupled with the at least one transceiver. The at least one processor may be configured to receive, through a fronthaul interface, a user plane (U-plane) message including U-plane data from a distributed unit (DU). The at least one processor may be configured to obtain, based on shifting operation corresponding to a modulation compression scheme, a modulation value corresponding to U-plane data. In a case of binary phase shift keying (BPSK), the modulation compression scheme may be set to perform the shifting operation based on a designated first equation. In a case of non-BPSK, the modulation compression scheme may be set to perform the shifting operation based on a designated second equation.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
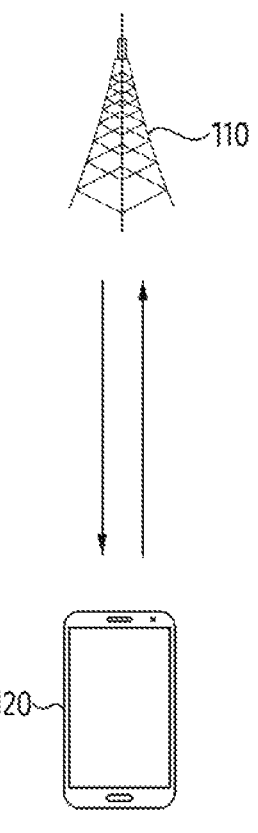
FIG. 1 illustrates a wireless communication system.

The terms used in the disclosure are merely used to better describe a certain embodiment and may not be intended to limit the scope of other embodiments. A singular expression may include a plural expression, unless the context clearly dictates otherwise. The terms used herein, including technical and scientific terms, may have the same meanings as those commonly understood by those skilled in the art to which the disclosure pertains. Terms defined in a general dictionary amongst the terms used in the disclosure may be interpreted as having the same or similar meaning as those in context of the related art, and they are not to be construed in an ideal or overly formal sense, unless explicitly defined in the disclosure. In some cases, even the terms defined in the disclosure may not be interpreted to exclude embodiments of the disclosure.

In various examples of the disclosure described below, a hardware approach will be described as an example. However, since one or more embodiments of the disclosure may include the technology that utilizes both the hardware-based approach and the software-based approach, they are not intended to exclude the software-based approach.

As used in the following description, the terms referring to a signal (e.g., signal, information, message, signaling), the terms referring to a resource (e.g. symbol, slot, subframe, radio frame, subcarrier, resource element (RE), resource block (RB), bandwidth part (BWP), opportunity), the terms referring to an operation state (e.g., step, operation, procedure), the terms referring to data (e.g. packet, user stream, information, bit, symbol, codeword), the terms referring to a channel, the terms referring to a network entity, the terms referring to components of an apparatus or device, or the like are only illustrated for convenience of description in the disclosure. Therefore, the disclosure is not limited to those terms described below, and other terms having the same or equivalent technical meaning may be used therefor.

Further, throughout the disclosure, an expression such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression such as 'above', a condition described as 'less than or equal to' may be replaced with an expression such as 'below', and a condition described as 'more than or equal to and below' may be replaced with 'above and less than or equal to', respectively. Furthermore, hereinafter, 'A' to 'B' means at least one of the elements from A (including A) to B (including B). Hereinafter, 'C' and/or 'D' means including at least one of 'C' or 'D', that is, {'C', 'D', or 'C' and 'D'}.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. In one embodiment, "at least one of A, B, and C" includes any of the following combinations: only A, only B, only C, both A and B, both A and C, both B and C, and all of A, B, and C. Similarly, the term "set" means one or more. Accordingly, the set of items may be a single item or a collection of two or more items.

The disclosure describes one or more embodiments using terms used in some communication standards (e.g., 3rd Generation Partnership Project (3GPP), extensible radio access network (xRAN), open-radio access network (O-RAN) or the like), but they are only of an example for explanation. The one or more embodiments of the disclosure may be easily modified even in other communication systems and applied thereto.

FIG. 1 illustrates a wireless communication system.

Referring to FIG. 1, it illustrates a base station 110 and a terminal 120 as a part of nodes using a wireless channel in a wireless communication system. Although FIG. 1 illustrates only one base station, the wireless communication system may further include another base station that is the same as or similar to the base station 110.

The base station 110 is a network infrastructure that provides wireless access to the terminal 120. The base station 110 may have a coverage defined based on a range capable of transmitting a signal. In addition to the term 'base station', the base station 110 may be referred to as 'access point (AP)', 'eNodeB (eNB)', '5th generation node', 'next generation nodeB (gNB)', 'wireless point', 'transmission/reception point (TRP)', or any other terms having the same or equivalent meaning thereto.

The terminal 120, which is a device used by a user, performs communications with the base station 110 via a wireless channel. A link from the base station 110 to the terminal 120 is referred to as a downlink (DL), and a link from the terminal 120 to the base station 110 is referred to as an uplink (UL). Further, although not shown in FIG. 1, the terminal 120 and other terminals may perform communications with each other through the wireless channel. In this context, a link between the terminal 120 and other terminals (device-to-device link, D2D) is referred to as a 'side link,' and the side link may be used mixed with a PC5 interface. In some other embodiments, the terminal 120 may be operated without any involvement by a user. According to an embodiment, the terminal 120, which is a device that performs machine-type communication (MTC), may not be carried by a user. Further, according to an embodiment, the terminal 120 may be a narrowband (NB)-Internet of things (IoT) device.

The terminal 120 may be referred to as 'user equipment (UE)', 'customer premises equipment (CPE)', 'mobile station', 'subscriber station', 'remote terminal', 'wireless terminal', 'electronic device', 'user device', or any other term having the same or equivalent technical meaning thereto.

The base station 110 may perform beamforming with the terminal 120. The base station 110 and the terminal 120 may transmit and receive radio signals in a relatively low frequency band (e.g., FR 1 (frequency range 1) of NR). Further, the base station 110 and the terminal 120 may transmit and receive radio signals in a relatively high frequency band (e.g., FR 2 of NR (or FR 2-1, FR 2-2, FR 2-3), FR 3 of NR, or a millimeter wave (mmWave) band (e.g., 28 GHz, 30 GHz, 38 GHz, 60 GHz)). In order to enhance the channel gain, the base station 110 and the terminal 120 may perform beamforming. In this context, the beamforming may include transmission beamforming and reception beamforming. The base station 110 and the terminal 120 may assign directivity to a transmission signal or a reception signal. To this end, the base station 110 and the terminal 120 may select serving beams by means of a beam search or beam management procedure. After the serving beams are selected, subsequent communication may be performed through a resource having a quasi co location (QCL) relationship with a resource that has transmitted the serving beams.

If the large-scale characteristics of a channel carrying symbols on a first antenna port may be inferred from a channel carrying symbols on a second antenna port, the first antenna port and the second antenna port may be evaluated to be in the QCL relationship. For example, the large-scale characteristics may include at least one of delay spread, Doppler spread, Doppler shift, average gain, average delay, or spatial receiver parameters.

Although FIG. 1 describes that both the base station 110 and the terminal 120 perform beamforming, embodiments of the disclosure are not necessarily limited thereto. In some embodiments, the terminal may or may not perform beamforming. Likewise, the base station may or may not perform beamforming. That is to say, only either one of the base station and the terminal may perform beamforming, or none of the base station and the terminal may perform beamforming.

In the disclosure, a beam, which means a spatial flow of a signal in a wireless channel may be formed by one or more antennas (or antenna elements), of which formation process may be referred to as 'beamforming.' The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an information element (IE) such as e.g., a CSI-RS resource, an SRS-resource, or the like may be used, and such a configuration may include information associated with a beam. Beam-associated information may refer to whether a corresponding configuration (e.g., CSI-RS resource) uses the same spatial domain filter as other configuration (e.g., another CSI-RS resource in the same CSI-RS resource set) or uses a different spatial domain filter, or with which reference signal it is quasi-co-located (QCLed), or if it is QCLed, what type it is (e.g., QCL type A, B, C, or D).

In a communication system with a relatively large cell radius of base station, each base station has been installed such that the respective base station includes functions of a digital processing unit (or distributed unit (DU)) and a radio frequency (RF) processing unit (or radio unit (RU)). However, as high-frequency bands are used in 4th generation (4G) systems and/or its subsequent communication systems (e.g., 5G) and the cell coverage of a base station decreased, the number of base stations to cover a certain area has increased. Thus, increased number of the base stations led to more increased burden of the initial installation cost for communication providers to install more base stations. In order to minimize the installation costs of the base stations, a structure has been proposed in which a DU and an RU of a base station are separated so that one or more RUs are connected to one DU through a wired network, and one or more RUs geographically distributed to cover a specific area are arranged. Hereinafter, examples of deployment structure and expansion of base stations according to one or more embodiments of the disclosure will be described with reference to FIGS. 2A to 2B.

Figure 2A:
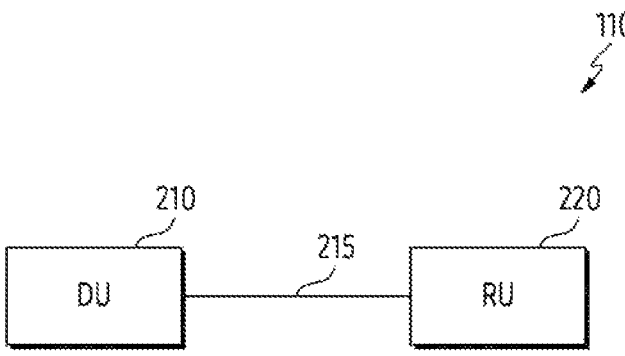
FIG. 2A illustrates a fronthaul interface.

FIG. 2A illustrates a fronthaul interface. A fronthaul refers to a link for entities between a wireless local area network (LAN) and a base station, as opposed to a backhaul for a link between a base station and a core network. Although FIG. 2A illustrate an example of a fronthaul structure between the DU 210 and one RU 220, the disclosure is not limited thereto. In other words, an embodiment of the disclosure may also be applied to a fronthaul structure between one DU and a multiplicity of RUs. For example, an embodiment of the disclosure may be applied to a fronthaul structure between one DU and two RUs. Further, an embodiment of the disclosure may be also applied to a fronthaul structure between one DU and three RUs.

Referring to FIG. 2A, the base station 110 may include a DU 210 and an RU 220. A fronthaul 215 between the DU 210 and the RU 220 may be operated through an Fx interface. For the operation of the fronthaul 215, an interface such as e.g., an enhanced common public radio interface (eCPRI) or a radio over Ethernet (ROE) may be used.

Along with further development of the communication technology, the mobile data traffic has increased a great deal, and thus, the bandwidth requirement demanded by the fronthaul between the digital unit and the radio unit has also increased significantly. In a deployment such as a centralized/cloud radio access network (C-RAN), the DU may be implemented to perform the functions for packet data convergence protocol (PDCP), radio link control (RLC), media access control (MAC), and physical (PHY), and the RU may be implemented to further perform the functions for a PHY layer in addition to the radio frequency (RF) function.

The DU 210 may serve as an upper layer of function of a wireless network. For example, the DU 210 may perform a function of a MAC layer and/or part of a PHY layer. Here, the part of the PHY layer, which is performed at a higher level of the functions of the PHY layer, may include, for example, channel encoding (or channel decoding), scrambling (or descrambling), modulation (or demodulation), or layer mapping (or layer de-mapping). According to an embodiment, in case that the DU 210 conforms to the O-RAN standard, it may be referred to as an O-DU (O-RAN DU). The DU 210 may be represented replaced by a first network entity for a base station (e.g., gNB) in embodiments of the disclosure, as occasion demands.

The RU 220 may serve as a lower layer of function of a wireless network. For example, the RU 220 may perform part of the PHY layer and/or the RF function. Here, the part of the PHY layer, which is performed at a relatively lower level than the DU 210 amongst functions of the PHY layer, may include, for example, inverse fast Fourier transform (iFFT) transformation (or FFT transformation), CP insertion (CP removal), and digital beamforming. An example of such a specific function split will be described in more detail with reference to FIG. 4. The RU 220 may be referred to as 'access unit (AU)', 'access point (AP)', 'transmission/reception point (TRP)', 'remote radio head (RRH)', 'radio unit (RU)', or any other terms having an equivalent technical meaning thereto. According to an embodiment, in case that the RU 220 conforms to the O-RAN standard, it may be referred to as an O-RU (O-RAN RU). The RU 220 may be represented replaced by a second network entity for a base station (e.g., gNB) in embodiments of the disclosure, as occasion demands.

Although FIG. 2A illustrates that the base station 110 includes the DU 210 and the RU 220, the embodiments of the disclosure are not limited thereto. According to embodiments, the base station may be implemented with a distributed deployment according to a centralized unit (CU) configured to perform a function of upper layers (e.g., packet data convergence protocol (PDCP), radio resource control (RRC), etc.) of an access network, and a distributed unit (DU) configured to perform a function of a lower layer. In this context, the distributed unit (DU) may include a digital unit (DU) and a radio unit (RU) of FIG. 1. Between a core network (e.g., 5G core (5GC) or next generation core (NGC) network) and a radio access network (RAN), the base station may be implemented with a deployment disposed in the order of CU, DU, and RU. An interface between the CU and the distributed unit (DU) may be referred to as an F1 interface.

The centralized unit (CU) may be connected to one or more DUs to act as an upper layer of function than the DU. For example, the CU may act as the functions of radio resource control (RRC) and packet data convergence protocol (PDCP) layers, and the DU and the RU may act as for the functions of lower layers. The DU may perform some functions (high PHY) of the radio link control (RLC), the media access control (MAC), and the physical (PHY) layers, and the RU may be responsible for the remaining functions (low PHY) of the PHY layer. Further, for example, the digital unit (DU) may be included in the distributed unit (DU) according to implementation of a distributed deployment of the base stations. Hereinafter, unless otherwise defined, description will be made of the operations of the digital unit (DU) and the RU, but it is to be noted that one or more embodiments of the disclosure may be applied to both the deployment of base stations including the CU or the deployment with the DU being directly connected to the core network (i.e., being implemented incorporated into a base station (e.g., NG-RAN node) where the CU and the DU constitute one entity).

Figure 2B:
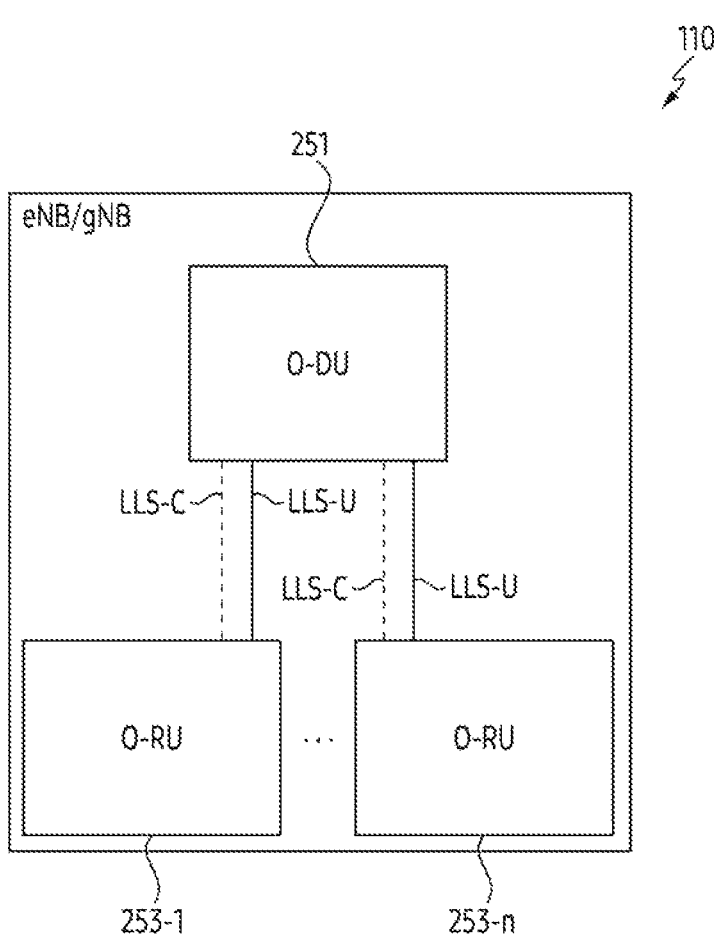
FIG. 2B illustrates a fronthaul interface of an open (O)-radio access network (RAN)

FIG. 2B illustrates a fronthaul interface of an O-RAN (open-radio access network), wherein an eNB or a gNB is illustrated as a base station 110 according to a distributed deployment.

Referring to FIG. 2B, the base station 110 may include an O-DU 251 and O-RUs (253-1, . . . , 253-n). Hereinafter, the operation and function of the O-RU 253-1 may be understood with an explanation for each of other O-RUs (e.g., O-RU 253-n).

The O-DU 251 is a logical node including functions except for the functions exclusively assigned to O-RU 253-1 amongst the functions of the base station (e.g., eNB, gNB) according to FIG. 4 to be described later. The O-DU 251 may control the operation of the O-RUs (253-1, . . . , 253-n). The O-DU 251 may be referred to as a lower layer split (LLS) central unit (CU). The O-RU 253-1 is a logical node including a subset amongst the functions of the base station (e.g., eNB, gNB) according to FIG. 4 to be described later. A real-time aspect of control plane (C-plane) communication and user plane (U-plane) communication with the O-RU 253-1 may be controlled by the O-DU 251.

The O-DU 251 may perform communication with the O-RU 253-1 via an LLS interface. The LLS interface corresponds to the fronthaul interface. The LLS interface means a logical interface between the O-DU 251 and the O-RU 253-1, using a lower layer functional split (i.e., intra-PHY-based function split). The LLS-C between the O-DU 251 and the O-RU 253-1 provides a C-plane through the LLS interface. The LLS-U between the O-DU 251 and the O-RU 253-1 provides a U-plane through the LLS interface.

In FIG. 2B, the entities of the base station 110 are referred to as 'O-DU' and 'O-RU' to describe O-RAN. However, such a naming is not to be construed to limit the embodiments of the disclosure thereto. In the embodiments described with reference to FIGS. 3A to 11, the operations of the DU 210 may be performed by the O-DU 251. In one embodiment, the description of the DU 210 may be also applied to the O-DU 251. Likewise, in the embodiments described with reference to FIGS. 3A to 12, the operations of the RU 220 may be performed by the O-RU 253-1, of course. The description of the RU 220 may be also applied to the O-DU 253-1.

Figure 3A:
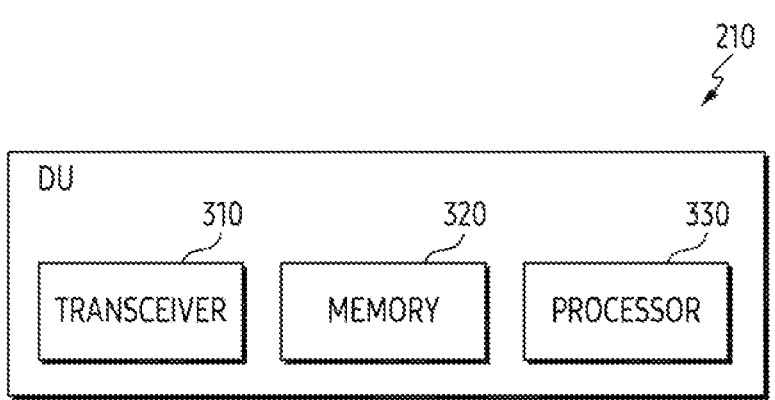
FIG. 3A illustrates a functional configuration of a distributed unit (DU)

FIG. 3A illustrates a functional configuration of a distributed unit (DU). The configuration illustrated in FIG. 3A may be understood as a configuration of the DU 210 of FIG. 2A (or O-DU 251 of FIG. 2B), which is a part of the base station. As used herein, the terms such as '~ module', '~ unit', or '~ part' may mean a unit for processing at least one function or operation, which may be implemented by hardware, software, or a combination of hardware and software.

Referring to FIG. 3A, the DU 210 includes a transceiver 310, a memory 320, and a processor 330.

The transceiver 310 may perform functions for transmitting and/or receiving signals in a wired communication environment. The transceiver 310 may include a wired interface for controlling a direct connection between an apparatus and another apparatus via a transmission medium (e.g., copper wire, optical fiber, or the like). For example, the transceiver 310 may transmit an electrical signal to other device through a copper wire or perform conversion between an electrical signal and an optical signal. The DU 210 may communicate with a radio unit (RU) via the transceiver 310. The DU 210 may be connected to a core network or a distributed CU via transceiver 310.

The transceiver 310 may perform the functions for transmitting and receiving signals in a wireless communication environment. For example, the transceiver 310 may perform a function for conversion between a baseband signal and a bit string according to a physical layer standard of a communication system. For example, upon data transmission, the transceiver 310 generates complex symbols by encoding and modulating a transmit bit string. Further, upon data reception, the transceiver 310 restores the received bit string through demodulation and decoding of the baseband signal. Further, the transceiver 310 may include a plurality of transmission/reception paths. Furthermore, according to an embodiment, the transceiver 310 may be connected to a core network or connected to other nodes (e.g., integrated access backhaul (IAB)).

The transceiver 310 may be configured to transmit and receive signals. For example, the transceiver 310 may transmit a management plane (M-plane) message. For example, the transceiver 310 may transmit a synchronization plane (S-plane) message. For example, the transceiver 310 may transmit a control plane (C-plane) message. For example, the transceiver 310 may transmit a user plane (U-plane) message. For example, the transceiver 310 may receive the U-plane message. Although only the transceiver 310 is illustrated in FIG. 3A, the DU 210 may include two or more transceivers, according to another embodiment.

The transceiver 310 may be configured to transmit and receive signals as described above. As such, all or at least part of the transceiver 310 may be also referred to as a communication unit, a transmission unit, a reception unit, or a transmission/reception unit. Further, throughout the following description, the transmission and/or reception performed via a wireless channel is used as a meaning including that the aforementioned process is performed by the transceiver 310.

Although not illustrated in FIG. 3A, the transceiver 310 may further include a backhaul transceiver for connection with a core network or another base station. The backhaul transceiver provides an interface for performing communication with other nodes in the network. In other words, the backhaul transceiver converts a bit string transmitted from a base station to another node, for example, other access node, other base station, a higher layer node, a core network or the like, into a physical signal and converts the physical signal received from the other node into a bit string.

The memory 320 stores data such as a basic program, application programs, and setting information for the overall operation of the DU 210. The memory 320 may be referred to as a storage unit. The memory 320 may be configured with a volatile memory, a non-volatile memory, or a combination of a volatile memory and a non-volatile memory. Further, the memory 320 provides stored data according to a request of the processor 330.

The processor 330 controls the overall operations of the DU 210. The processor 380 may be referred to as a controller. For example, the processor 330 transmits and receives signals via the transceiver 310 (or via a backhaul communication unit). Further, the processor 330 records and reads data into/from the memory 320. Further, the processor 330 may perform functions of a protocol stack required by the communication standard. Although only the processor 330 is illustrated in FIG. 3A, the DU 210 may include two or more processors, according to an example of another implementation.

The configuration of the DU 210 illustrated in FIG. 3A is only of an example, and the configuration of the DU performing the embodiments of the disclosure is not limited to the configuration illustrated in FIG. 3A. In some embodiments, a portion of the configuration may be added, deleted, or changed.

Figure 3B:
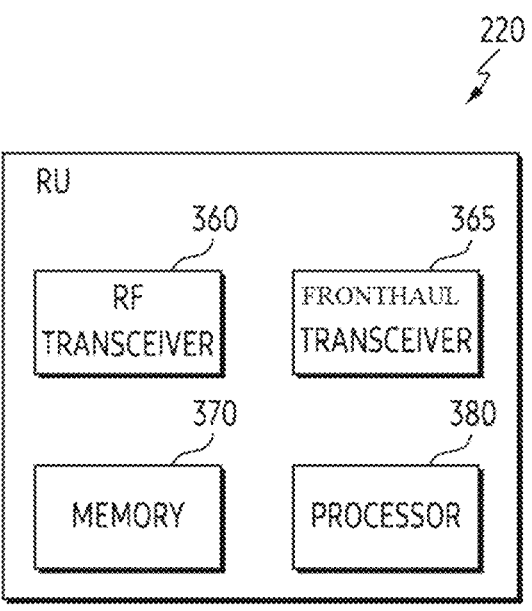
FIG. 3B illustrates a functional configuration of a radio unit (RU)

FIG. 3B illustrates a functional configuration of a radio unit (RU). The configuration illustrated in FIG. 3B may be understood as a configuration of the RU 220 of FIG. 2B or the O-RU 253-1 of FIG. 2B, which is a part of the base station. As used herein, the terms such as '~ module', '~ unit', or '~ part' may mean a unit for processing at least one function or operation, which may be implemented by hardware, software, or a combination of hardware and software.

Referring to FIG. 3B, the RU 220 may include an RF transceiver 360, a fronthaul transceiver 365, a memory 370, and a processor 380.

The RF transceiver 360 performs the functions for transmitting and receiving signals through a wireless channel. For example, the RF transceiver 360 up-converts a baseband signal into an RF band signal to transmit the RF band signal through an antenna, and down-converts an RF band signal received through the antenna into a baseband signal. For example, the RF transceiver 360 may include a transmission filter, a reception filter, an amplifier, a mixer, an oscillator, a DAC, an ADC, or the like.

The RF transceiver 360 may include a plurality of transmission/reception paths. Furthermore, the RF transceiver 360 may include an antenna unit. The RF transceiver 360 may include at least one antenna array configured with a plurality of antenna elements. In terms of hardware, the RF transceiver 360 may be configured with a digital circuit and an analog circuit (e.g., radio frequency integrated circuit (RFIC)). Here, the digital circuit and the analog circuit may be implemented in a single package. Further, the RF transceiver 360 may include a plurality of RF chains. The RF transceiver 360 may perform beamforming. The RF transceiver 360 may apply a beamforming weight to a signal in order to give a directivity according to the setting of the processor 380 to the signal for transmission and reception. According to an embodiment, the RF transceiver 360 may include a radio frequency (RF) block (or an RF unit).

According to an embodiment, the RF transceiver 360 may transmit and receive a signal over a radio access network. For example, the RF transceiver 360 may transmit a downlink signal. The downlink signal may include a synchronization signal (SS), a reference signal (RS) (e.g., cell-specific reference signal (CRS), DM(demodulation)-RS), system information (e.g., master information block (MIB), system information block (SIB), remaining system information (RMSI), other system information (OSI)), configuration messages, control information, or downlink data. Further, for example, the RF transceiver 360 may receive an uplink signal. The uplink signal may include a random access related signal (e.g., random access preamble: RAP) (or Msg1 (message 1), Msg3 (message 3)), a reference signal (e.g., sounding reference signal (SRS), DM-RS), a power headroom report (PHR) or the like. Although only the RF transceiver 360 is illustrated in FIG. 3B, the RU 220 may include two or more RF transceivers, according to an example of another implementation.

According to embodiments, the RF transceiver 460 may transmit RIM-RS. The RF transceiver 460 may transmit a first type of RIM-RS (e.g., RIM-RS type 1 of 3GPP) for notifying detection of far-field interference. The RF transceiver 460 may transmit a second type of RIM-RS (e.g., RIM-RS type 2 of 3GPP) for notifying presence or absence of the far-field interference.

The fronthaul transceiver 365 may transmit and receive a signal. According to an embodiment, the fronthaul transceiver 365 may transmit and receive the signal on a fronthaul interface. For example, the fronthaul transceiver 365 may receive a management plane (M-plane) message. For example, the fronthaul transceiver 365 may receive a synchronization plane (S-plane) message. For example, the fronthaul transceiver 365 may receive a control plane (C-plane) message. For example, the fronthaul transceiver 365 may transmit a user plane (U-plane) message. For example, the fronthaul transceiver 365 may receive the user plane message. Although only the fronthaul transceiver 365 is illustrated in FIG. 3B, the RU 220 may include two or more fronthaul transceivers, according to an example of another implementation.

The RF transceiver 360 and the fronthaul transceiver 365 transmit and receive signals as described above. As such, all or at least part of the RF transceiver 360 and the fronthaul transceiver 365 may be referred to as 'communication unit', 'transmission unit', 'reception unit', or 'transceiver unit'. Further, throughout the following description, the transmission and/or reception performed via a wireless channel may be used as a meaning including that the aforementioned process is performed by the transceiver 310.

The memory 370 stores data such as a basic program, application programs, and setting information for the overall operation of the RU 220. The memory 370 may be referred to as a storage unit. The memory 370 may be configured with a volatile memory, a nonvolatile memory, or a combination of a volatile memory and a nonvolatile memory. Further, the memory 370 provides stored data according to a request of the processor 380. According to an embodiment, the memory 370 may include a memory for storing conditions, instructions, or setting values related to the SRS transmission scheme.

The processor 380 controls the overall operations of the RU 220. The processor 380 may be referred to as a controller. For example, the processor 380 transmits and receives signals via the RF transceiver 360 or the fronthaul transceiver 365. Further, the processor 380 writes and reads data into/from the memory 370. Further, the processor 380 may perform the functions of a protocol stack required by the communication standard. Although only the processor 380 is illustrated in FIG. 3B, the RU 220 may include two or more processors, according to another implementation example. The processor 380 may include a storage space for storing instructions/codes at least temporarily resident in the processor 380, the instructions/codes being an instruction set or code stored in the memory 370, or may be part of a circuitry configuring the processor 380. Further, the processor 380 may include various communication modules for performing the communication. The processor 380 may control the RU 220 to perform operations according to the following embodiments of the disclosure.

The configuration of the RU 220 illustrated in FIG. 3B is only of an example, and the example of the RU performing the embodiments of the disclosure is not limited to the configuration illustrated in FIG. 3B. In some configurations, some of the configuration may be subject to addition, deletion, or change.

Figure 4:
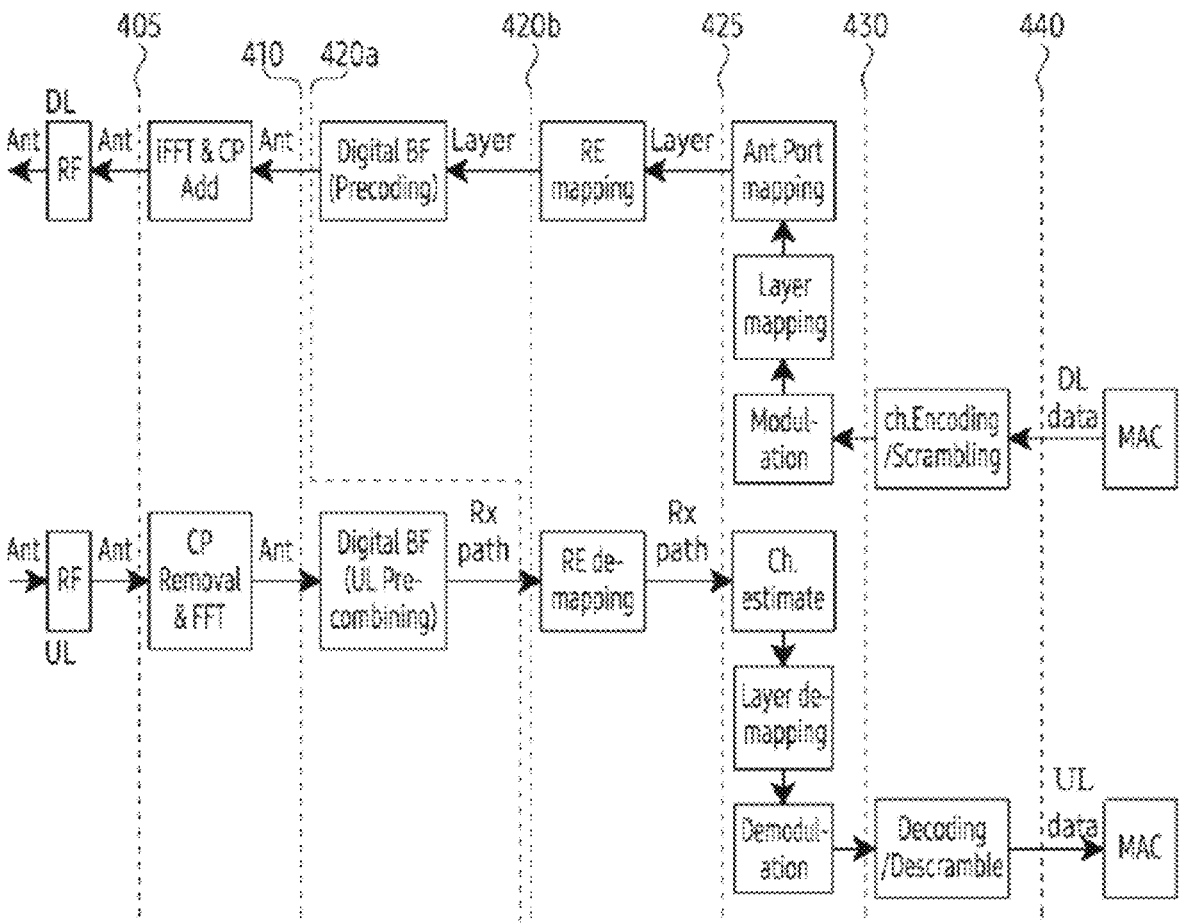
FIG. 4 illustrates an example of a function split between the DU and the RU.

FIG. 4 illustrates an example of a function split in between a DU and an RU. Along with latest developments in wireless communication technologies (e.g., the introduction of 5G communication system or NR (new radio) communication system), the frequency band used has increased even more. Further, as the cell radius of a base station becomes very small, the number of RUs requiring installation further increases. Furthermore, in the 5G communication system, the amount of data transmission has greatly increased by 10 times or more, and thus, the data transmission capacity of a wired network transmitted to a fronthaul has significantly increased. Therefore, due to the above-described factors, the initial installation costs for the wired network in the 5G communication system may increase very significantly. As such, in order to decrease the transmission capacity of the wired network and reduce the installation costs for the wired network, the 'function split' may be used to reduce the transmission capacity of the fronthaul by transferring some functions of a modem of a DU to a RU.

To reduce the burden on the DU, a role of the RU, which is only responsible for the existing RF function, may be extended to some function of the physical layer. The higher layer of functions the RU performs, the more the throughput of the RU may increase to increase the transmission bandwidth at the fronthaul, and simultaneously, lower constraint of the latency requirement due to response processing. Meanwhile, the higher layer of function the RU performs, the less virtualization gain it obtains and the more the size, weight, and cost of the RU increase. Therefore, it is required to implement the optimal function split in consideration of the trade-off of the above-described advantages and disadvantages.

Referring to FIG. 4, the function splits in the physical layer below the MAC layer are illustrated. In the case of a downlink (DL) transmitting signals to a terminal over a wireless network, a base station may sequentially perform channel encoding/scrambling, modulation, layer mapping, antenna mapping, RE mapping, digital beamforming (e.g., precoding), iFFT transformation/CP insertion, and RF conversion. In the case of uplink (UL) receiving signals from a terminal over a wireless network, a base station may sequentially perform RF conversion, FFT transformation/CP removal, digital beamforming (e.g., pre-combining), RE de-mapping, channel estimation, layer de-mapping, demodulation, decoding/de-scrambling. The function split of uplink functions and downlink functions may be defined in various types by the needs between the vendors, the discussion on the standards, and so on, according to the aforementioned trade-off.

In the first function split 405, the RU performs the RF function and the DU performs the PHY function. In the first function split, the PHY function in the RU is not substantially implemented, and it may be referred to as Option 8, for example. In the second function split 410, the RU performs iFFT transformation/CP addition in the DL of the PHY function and FFT transformation/CP removal in the UL, and the DU performs the remaining PHY functions. For example, the second function split 410 may be referred to as Option 7-1. In the third function split 420a, the RU performs iFFT transformation/CP addition in DL of the PHY function and FFT transformation/CP removal and digital beamforming in the UL, and the DU performs the remaining PHY functions. For example, the third function split 420a may be referred to as Option 7-2x Category A. In a fourth function split 420b, the RU performs up to digital beamforming in both the DL and the UL, and the DU performs the upper PHY functions after the digital beamforming. For example, the fourth function split 420b may be referred to as Option 7-2x Category B. In the fifth function split 425, the RU performs up to RE mapping (or RE de-mapping) in both the DL and the UL, and the DU performs the upper PHY functions after the RE mapping (or RE de-mapping). For example, the fifth function split 425 may be referred to as Option 7-2. In the sixth function split 430, the RU performs up to modulation (or demodulation) in both the DL and the UL, and the DU performs the upper PHY functions after the modulation (or demodulation). For example, the sixth function split 430 may be referred to as Option 7-3. In the seventh function split 440, the RU performs up to encoding/scrambling (or decoding/de-scrambling) in both the DL and the UL, and the DU performs the upper PHY functions following the modulation (or demodulation). For example, the seventh function split 440 may be referred to as Option 6.

According to an embodiment, in the case where a large amount of signal processing is expected as in FR 1 MMU, the function split (e.g., fourth function split 420b) at a relatively upper layer may be required to reduce the fronthaul capacity. Further, the function split at a too high layer (e.g., the sixth function split 430) may lead to more complicated control interface and cause a significant burden on the implementation of the RU due to inclusion of multiple PHY processing blocks in the RU, and therefore, an appropriate function split may be required depending on the deployment and the implementation scheme of the DU and RU.

According to an embodiment, in the case where it is not possible to process the precoding of data received from the DU (i.e., when the precoding capability of the RU is limited), the third function split 420a or its lower function split (e.g., the second function split 410) may be applied. To the contrary, in the case where it is capable of processing the precoding of data received from the DU, the fourth function split 420b or its higher function split (e.g., the sixth function split 430) may be applied.

Hereinafter, in the disclosure, the embodiments are described on the basis of the third function split 420a (which may be referred to as category A or CAT-A) or the fourth function split 420b (which may be referred to as category B or CAT-B), for performing beamforming process in the RU, unless otherwise defined. The O-RAN specification distinguishes the type of O-RU, depending on whether the precoding function is located either on an O-DU interface or on an O-RU interface. An O-RU (i.e., with low complexity) in which no precoding is performed may be referred to as a CAT-A O-RU. The O-RU in which the precoding is performed may be referred to as a CAT-B O-RU.

Hereinafter, an upper PHY refers to a physical layer processing carried out in a DU of a fronthaul interface. For example, the upper PHY may include forward error correction (FEC) encoding/decoding, scrambling, and modulation/demodulation. Hereinafter, a lower PHY refers to a physical layer processing carried out in a RU of a fronthaul interface. For example, the lower PHY may include FFT/iFFT, digital beamforming, or physical random access channel (PRACH) extraction and filtering. However, it is to be noted that the aforementioned criteria do not exclude embodiments implemented through other function splits. Functional configuration, signaling, or operations to be described below may be described on the basis of the third function split 420a or the fourth function split 420b, but they may also apply to other function splits.

Embodiments of the disclosure describe as an example the specifications of eCPRI and O-RAN as a fronthaul interface, when transmitting a message between a DU (e.g., DU 210 in FIG. 2A) and an RU (e.g., RU 220 in FIG. 2A). The Ethernet pay load of the message may include an eCPRI header, an O-RAN header, and additional fields. Hereinafter, one or more embodiments of the disclosure will be described using the standard terms of eCPRI or O-RAN, but it is to be noted that any other expressions having the same or equivalent meaning to a corresponding term may be used in substitution in the one or more embodiments of the disclosure.

For a transport protocol of the fronthaul, Ethernet and eCPRI may be used which are easy to share with the network. An eCPRI header and an O-RAN header may be included in the Ethernet payload. The eCPRI header may be located at a front-end of the Ethernet payload. The contents of the eCPRI header are as follows:

ecpriVersion (4 bits): This parameter indicates an eCPRI protocol version.

ecpriReserved (3 bits): This parameter is reserved for further use of eCPRI.

ecpriConcatenation (1 bit): This parameter indicates when eCPRI concatenation is in use.

ecpriMessage (1 byte): This parameter indicates a type of service carried by a message type. For example, the parameter indicates an IQ (in-phase/quadrature-phase) data message, a real-time control data message, or a transmission network delay measurement message.

ecpriPayload (2 bytes): This parameter indicates a byte size of a payload portion of the eCPRI message.

ecpriRtcid/ecpriPcid (2 bytes): This parameter is an eAxC (extended antenna-carrier) identifier (eAxC ID), identifying specific data flow related to each C-plane (ecpriRtcid) or U-plane (ecpriPcid) message.

ecpriSeqid (2 bytes): This parameter provides unique message identification and sequence in two levels. A first octet of this parameter is a sequence ID used to identify the sequence of messages within eAxC message stream, and the sequence ID is used to verify that all the messages have been received and to rearrange out-of-order messages. A second octet of this parameter is a sub sequence ID. This sub sequence ID is used to verify the sequence and implement its rearrangement, when a radio-transport-level fragmentation (eCPRI or IEEE-1914.3) occurs.

eAxC identifier (ID): This ID includes a band and sector identifier ('BandSector_ID'), a component carrier identifier ('CC_ID'), a spatial stream identifier ('RU_Port_ID'), and a distributed unit identifier ('DU_Port_ID'). Bit allocation of eAxC ID may be classified as follows.

DU_port ID: This ID is used to distinguish processing units in O-DU (e.g., other baseband cards). It is expected that the O-DU will allocate bits for the DU_port ID and the O-RU will attach the same value to the UL U-plane message carrying the same sectionId data.

BandSector_ID: This ID is an aggregated cell identifier (band and sector classification supported by O-RU).

CC_ID: This ID is used to distinguish carrier components supported by O-RU.

RU_port ID: This ID specifies logical flows such as e.g., data layers or spatial streams, and logical flows such as signal channels requiring special antenna assignment, such as e.g., separate numerologies (e.g., PRACH) or SRS.

Application protocol of the fronthaul may include a control plane (C-plane), a user plane (U-plane), a synchronization plane (S-plane), and a management plane (M-plane).

The control plane may be configured to provide scheduling information and beamforming information via a control message. The control plane means real-time control between a DU and a RU. The user plane may include IQ sample data transmitted between the DU and the RU. The user plane may include downlink data (IQ data or SSB/RS), uplink data (IQ data or SRS/RS), or PRACH data of the user. The weight vector of the aforementioned beamforming information may be multiplied by a user's data. The synchronization plane generally typically means traffic between the DU and the RU for a synchronization controller (e.g., IEEE grandmaster). The synchronization plane may be related to timing and synchronization. The management plane means non-real-time control between the DU and the RU. The management plane may be related to an initial setup, a non-real-time reset, or a reset, or a non-real-time report.

A message of the control plane, that is, a C-plane message may be encapsulated based on a two-layer header approaching scheme. The first layer may consist of an eCPRI common header or an IEEE 1914.3 common header, including fields used to indicate a message type. The second layer is an application layer including fields necessary for control and synchronization. A section in the application layer defines the characteristics of U-plane data transmitted or received in a beam with one pattern ID. The section types supported in the C-plane are as follows.

The section type may indicate the use of the control message transmitted in the control plane. For example, the use per section type may be defined as follows.

1) sectionType=0: This is used to indicate resource blocks or symbols that are not used in DL or UL.

2) sectionType=1: This is used for most DL/UL radio channels, wherein the term 'most' indicates the channels that do not require time or frequency offset, as those required for mixed neuronal channels.

3) sectionType=2: This is reserved for further use.

4) sectionType=3: This is for a PRACH and mixed-numerology channel, and the channel requiring a time or frequency offset or different from the nominal SCS value(s).

5) sectionType=4: This is reserved for further use.

6) sectionType=5: This is UE scheduling information, delivering UE scheduling information so that the RU can perform real-time BF weight calculation (O-RAN optional BF scheme).

7) sectionType=6: This is for UE-specific channel information transmission, periodically delivering the UE channel information so that the RU can perform real-time BF weight calculation (O-RAN optional BF scheme).

8) sectionType=7: This is used to support LAA

According to the O-RAN standard, a fronthaul interface standard between the DU and the RU according to various function split structures is defined. For example, according to the O-RAN standard, a standard interface in a split structure (e.g., a 7-2x function split structure) to which Ethernet is applied is provided.

According to an embodiment, one of a plurality of compression schemes may be used within each section to increase the efficiency of data transmission between the DU and the RU. Among the plurality of compression schemes, a MC scheme is a lossless scheme, has little or no data loss due to compression, and has very high compression efficiency. When the MC scheme is applied, a constellation shift flag (csf) and digital gain scale information (e.g., modComp-Scaler, modScaleOffset) corresponding to U-plane information may be delivered together to C-plane through Extension Type 4/5.

For example, according to the MC scheme, a scaling process, a mapping process, and/or a shifting process of signals may be performed in a modulation process and a compression process. A scaling value and/or a shifting value used in each process may be set in various ways. Based on the scaling value and/or the shifting value, the compression process and/or a decompression process may be performed.

In the following specification, a technical feature for simplifying the scaling and mapping process included in the compression and decompression process of the MC scheme using a quantized integer value rather than a floating value as a value of constellation points used in the MC scheme (e.g., the compression process) may be proposed. According to the proposed technical feature, the compression and decompression process of the MC scheme may be easily implemented and interpreted. According to an embodiment, a new O-RAN standard for collision prevention and backward compatibility according to a new MC scheme may be proposed.

For example, when data is transmitted, a modulation compression (MC) may be applied (or used). When the MC is applied, a rule according to scaling, mapping, shifting, and case may be applied according to one or more steps. In the following specification, a technical feature of an MC scheme for simplifying the one or more steps may be proposed.

In RAN, several types of compression methods may be used in each section to increase data transmission efficiency between a DU and an RU. The compression techniques may include, for example, no-compression technique, block floating point compression (BFPC) technique, modulation compression (MC) technique, or the like. An IQ data frame of O-RAN standard may include a user data compression header (e.g., udCompHdr). The user data compression header may be defined and transferred with a designated bit width (e.g., 4-bit 'udIqWidth') and the compression method (e.g., 4-bit 'udCompMeth'). For example, the compression method may be defined as shown in the Table 1 below.

TABLE 1

| udCompMeth | compression method | udIqWidth meaning |
|---|---|---|
| 0000b | no compression | bitwidth of each uncompressed I and Q value |
| 0001b | Block floating point (BFP) | bitwidth of each I and Q mantissa value |
| 0010b | Block scaling | bitwidth of each I and Q scaled value |
| 0011b | μ -law | bitwidth of each compressed I and Q value |
| 0100b | Modulation compression | bitwidth of each compressed I and Q value |
| 0101b | BFP + selective RE sending | bitwidth of each compressed I and Q value |
| 0110b | Mod-compr + selective RE sending | bitwidth of each compressed I and Q value |
| 0111b-1111b | Reserved for further methods | depends on the specific compression method |

Among the aforementioned compression techniques, the MC scheme is a non-loss method, with no data loss and high compression efficiency. The MC scheme on the feature that a modulated data symbol may be expressed with bits of a very limited number of in-phase (I) component and bits of quadrature (Q) component. For example, since a QPSK (quadrature phase shift keying) modulated symbol has only two potential states of I and two potential states of Q, the QPSK modulated symbol may be represented as a single bit for I component and a single bit for Q component without information loss. For another example, a symbol modulated with 64 QAM may be represented with 3 bits for I component and 3 bits for Q component at maximum.

FIGS. 5A to 5D illustrate constellation point for each modulation and coding scheme (MCS).

FIGS. 6A to 6D illustrate shifted constellation points for each MCS.

Referring to FIGS. 5A to 5D, a U-plane message may include I component and Q component of data. For the I component of data in the U-plane message, 16 bits may be used. For the Q component of data in the U-plane message, 16 bits may be used. That is, 32 bits may be used for data transfer in the U-plane message.

Figure 5A:
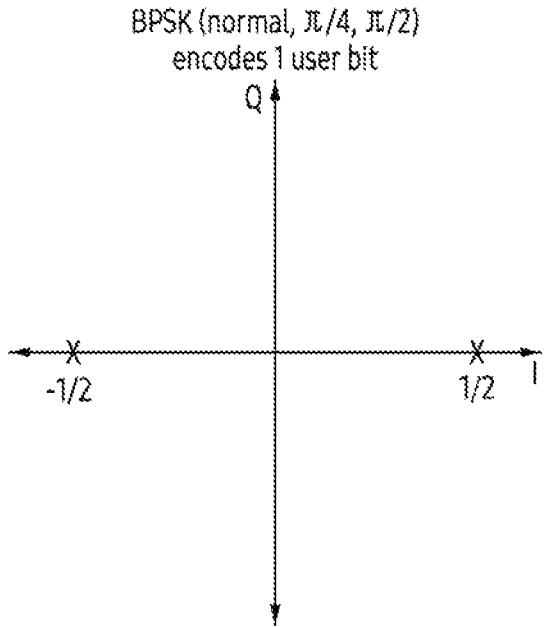
FIGS. 5A to 5D illustrate constellation point for each modulation and coding scheme (MCS)

For example, when binary phase shift keying (BPSK) modulation according to FIG. 5A is used for modulation compression, I component may be represented by 2 bits. Q component may be represented by 2 bits. As an example, I component and Q component may be represented by 2 bits for representing −1/2, 0, and 1/2, respectively. For modulation compression, when BPSK modulation is used, the number of bits transmitted may be reduced from 32 bits to 4 bits.

Figure 5B:
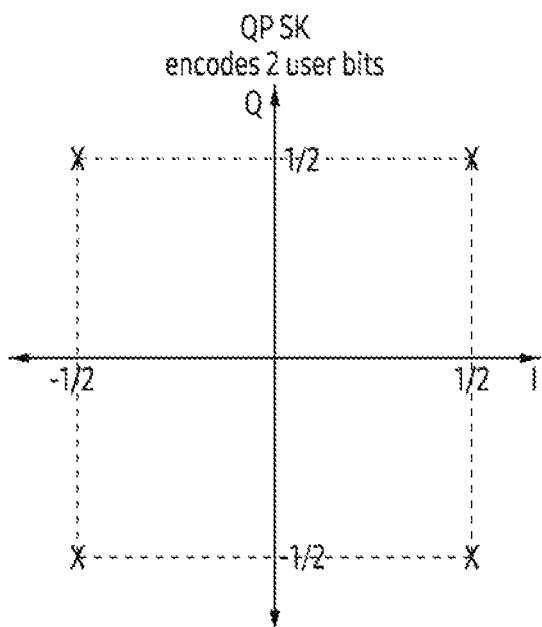

For example, when QPSK modulation according to FIG. 5B is used for modulation compression, I component may be represented by 1 bit. Q component may be expressed by 1 bit. For modulation compression, when QPSK modulation is used, the number of bits transmitted may be reduced from 32 bits to 2 bits.

Figure 5C:
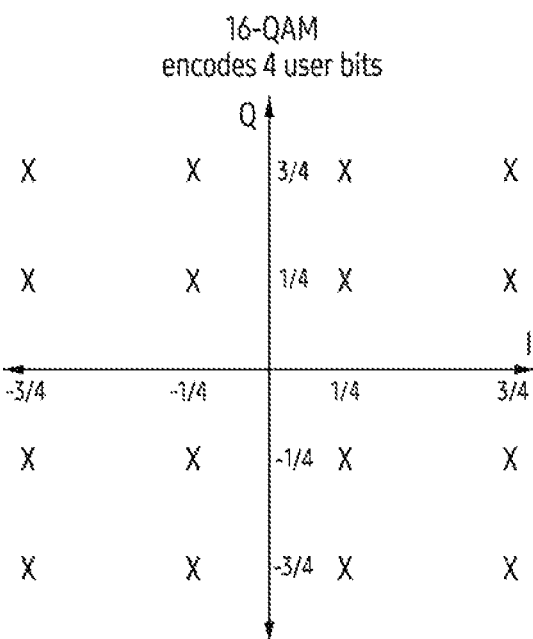

For example, when 16-QAM modulation according to FIG. 5C is used for modulation compression, I component may be represented by 2 bits. Q component may be represented by 2 bits. For modulation compression, when 16-QAM modulation is used, the number of bits transmitted may be reduced from 32 bits to 4 bits.

Figure 5D:
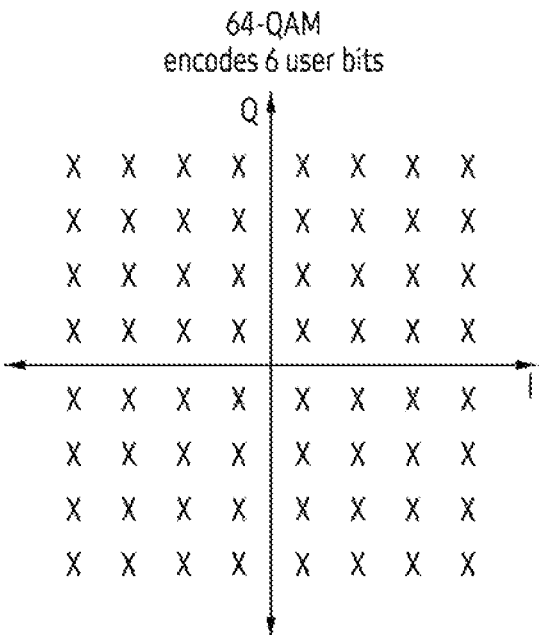

For example, when 64-QAM modulation according to FIG. 5D is used for modulation compression, I component may be represented by 3 bits. Q component may be represented by 3 bits. For modulation compression, when 16-QAM modulation is used, the number of bits transmitted may be reduced from 32 bits to 6 bits.

Referring to FIGS. 6A to 6D, in MC scheme, constellation points may be obtained (or identified) by modulating bit level information for each modulation and coding scheme (MCS). Constellation points may be converted to shifted constellation point (SCP) and transmitted (or delivered) to U-plane.

For example, in order to represent values of I component and Q component capable allowing overlap of multiple constellation sizes that may be represented as single word-width, constellations may be shifted so that two's-complement may represent each constellation point. For example, BPSK constellation points may not be shifted. I component may be −1/2 or 1/2. Q component may be zero. In addition, for example, QPSK constellation points may be shifted by −1/2. I component may be −1 or 0. Q component may be −1 or 0. In addition, for example, 16 QAM constellation points may be shifted by −1/4. I component may be −1, −1/2, 0, or 1/2. Q component may be −1, 1/2, 0, or 1/2. In addition, for example, 64 QAM constellation points may be shifted by −1/8. I component may be −1, −3/4, −1/2, −1/4, 0, 1/4, 1/2, or 3/4. Q component may be −1, −3/4, −1/2, −1/4, 0, 1/4, 1/2, or 3/4.

For example, MC scheme converts bit-level information into a shifted constellation point (SCP). DU (e.g., the DU 210) may transmit a U-plane message including the converted information according to the SCP to RU (e.g., the RU 220). The DU 210 may transmit, to the RU 220, a constellation shift flag (csf) for indicating whether to shift. For example, when a value of csf is 1, a shift value of each constellation point at a specific bit width may be defined as shown in Table 2. For example, a shift value used when constellation points are converted to SCP may be defined as shown in Table 2 according to iq width (e.g., udIqWidth) value designated by MCS or physical resource block (PRB).

TABLE 2

| udIqWidth | Shift value |
|-----------|-------------|
| 1 | 1/2 |
| 2 | 1/4 |
| 3 | 1/8 |
| 4 | 1/16 |
| 5 | 1/32 |

For example, when constellation points are shifted, constellation shift flag (csf) may be set to 1. When constellation points are not shifted, constellation shift flag may be set to 0.

According to an embodiment, when a plurality of MCSs are applied to one PRB (e.g., mixed-MCS case), iqWidth may be designated as a maximum value. Constellation shift flag may be designated (or set) as 1 only for highest MCS among MCSs used. Constellation shift flag of the remaining MCSs (e.g., lower MCS) except for the highest MCS may be designated (or set) as 0. The embodiment may be essentially performed in a mixed-MCS case. Shift method may be set as shown in the following examples according to cases related to MCS.

For example, in a non-mixed MCS case, constellation shift flag may be designated (or set) as 0 for BPSK modulation. In non-mixed MCS case, constellation shift flag may be designated (or set) as 1 for other QAMs except for BPSK.

For example, in mixed MCS case, constellation shift flag may be designated (or set) as 1 in highest MCS, and designated (or set) as 0 in the remaining MCSs (or other MCSs).

For example, in mixed MCS case, QPSK modulation and BPSK modulation may be applied together. According to BPSK modulation, iqWidth may be designated (or set) as 2. Constellation shift flag may be designated (or set) as 1 in QPSK modulation. Constellation shift flag may be designated (or set) as 0 in the BPSK modulation.

Data compressed according to MC scheme does not indicate actual power value. The DU 210 may transmit a modulation compression scaler value (modCompScaler) to the RU 220 so that the RU 220 may set a power level to modulation-compressed data. For example, a constellation shift flag (csf) and digital gain scale information (e.g., modCompScaler parameter and modScaleOffset parameter) corresponding to U-plane information may be delivered together to C-plane through Extension Type 4/5. For example, the digital gain scale information is a value corresponding to a power level of RE data and may not include phase information.

For example, the modCompScaler parameter indicates a scale factor to be applied to a constellation point unshifted during decompression. In O-RAN specification, the 'mod-CompScaler' parameter may be provided to the RU 220 through section extension information (e.g., Section Extension Type 4). The 'modCompScaler' parameter may indicate an exponential component and a mantissa component through the following equation.

$$\text{``}mantissa\text{''} = \sum_{k=0}^{10} modCompScaler[k] \cdot 2^{k-11} \qquad \text{[Equation 1]}$$

$$\text{``}exponent\text{''} = \sum_{k=11}^{14} modCompScaler[k] \cdot 2^{k-11}$$

'mantissa' represents mantissa component of an indicated value. 'exponent' represents exponential component of an indicated value. modCompScaler[k] represents k+1th bit of the 'modCompScaler' parameter. For example, modComp-Scaler[0] represents first bit of the 'modCompScaler' parameter. modCompScaler[14] represents 15th bit of the 'mod-CompScaler' parameter.

Most significant 4-bits among 15 bits of the 'modComp-Scaler' parameter indicate exponential component, and least significant 11-bits among the 15 bits of the 'modComp-Scaler' parameter indicate mantissa component. Therefore, a value indicated by the 'modCompScaler' parameter is same as following equation.

$$modCompScaler = mantissa \cdot 2^{-exponent} \qquad \text{[Equation 2]}$$

'mantissa' represents mantissa component of an indicated value. 'exponent' represents exponential component of an indicated value.

Section Extension 4 of O-RAN specification delivering the 'modCompScaler' parameter is shown in the table below.

TABLE 3

| cf | extType = 0x04 | 1 | Octet N |
| | extLen = 0x01 (1 word) | 1 | N + 1 |
| csf | modCompScaler[14:8] | 1 | N + 2 |
| | modCompScaler[7:0] | 1 | N + 3 |

The DU 210 may transmit a modulation compression power scale RE mask (mcScaleReMask) to the RU 220. The 'mcScaleReMask' parameter may indicate a position of RE together with identical scaling and a modulation type within PRB. Similar to the 'modCompScaler' parameter, the DU 210 may deliver a scaling value for modulation compression (mcScaleOffset) to the RU 220.

The 'mcScaleOffset' parameter indicates a scale factor to be applied to an unshifted constellation point during decompression. In the O-RAN specification, the 'mcScaleOffset' parameter may be provided to the RU 220 through section extension information (e.g., Section Extension Type 4). The 'mcScaleOffset' parameter may indicate an exponential component and a mantissa component through the following equation.

$$\text{``}mantissa\text{''} = \sum_{k=0}^{10} mcScaleOffset[k] \cdot 2^{k-11} \qquad \text{[Equation 3]}$$

20

-continued $$\text{``}exponent\text{''} = \sum_{k=11}^{14} mcScaleOffset[k] \cdot 2^{k-11}$$

'mantissa' indicates a mantissa component of an indicated value. 'exponent' indicates an exponential component of an indicated value. mcScaleOffset[k] indicates k+1th bit of the 'mcScaleOffset' parameter. For example, mcScaleOffset[0] indicates first bit of the 'mcScaleOffset' parameter. mcScaleOffset[14] indicates 15th bit of the 'mcScaleOffset' parameter.

Most significant 4-bits among the 15 bits of the 'mcSca-leOffset' parameter indicate the exponential component, and the least significant 11-bits among the 15 bits of the 'mcSca-leOffset' parameter indicate the mantissa component. Therefore, a value indicated by the 'mcScaleOffset' parameter is same as following equation.

$$mcScaleOffset = mantissa \cdot 2^{-exponent} \qquad \text{[Equation 4]}$$

'mantissa' indicates a mantissa component of an indicated value. 'exponent' indicates an exponential component of an indicated value.

Section Extension 5 of the O-RAN specification delivering the 'mcScaleOffset' parameter is shown in the following tables. Table 4 shows one scaler value, and Table 5 shows two scaler values.

TABLE 4

| ef | extType = 0x05 | 1 | Octet N |
| | extLen = 0x2 (2 words) | 1 | N + 1 |
| | mcScaleReMask[11:4] | 1 | N + 2 |
| mcScaleReMask[3:0] | csf mcScaleOffset [14:12] | 1 | N + 3 |
| | mcScaleOffset [11:4] | 1 | N + 4 |
| mcScaleOffset [3:0] | zero padding | 1 | N + 5 |
| | zero padding | 1 | N + 6 |
| | zero padding | 1 | N + 7 |

TABLE 5

| ef | extType = 0x05 | 1 | Octet N |
| | extLen = 0x03 (3 words) | 1 | N + 1 |
| | mcScaleReMask[11:4] | 1 | N + 2 |
| mcScaleReMask[3:0] | csf mcScaleOffset [14:12] | 1 | N + 3 |
| | mcScaleOffset [11:4] | 1 | N + 4 |
| mcScaleOffset [3:0] | mcScaleReMask[11:8] | 1 | N + 5 |
| | mcScaleReMask[7:0] | 1 | N + 6 |
| csf | mcScaleOffset [14:8] | 1 | N + 7 |
| | mcScaleOffset [7:0] | 1 | N + 8 |
| | zero padding | 1 | N + 9 |
| | zero padding | 1 | N + 10 |
| | zero padding | 1 | N + 11 |

Section extension information of Tables 3 to 5 described above may be included in a C-plane message. The RU 220 may restore an original signal intended by the DU 210, based on compressed data received through a U-plane message and a parameters received through the C-plane message. According to an embodiment, the RU 220 may obtain an original signal from compressed bits based on the 'csf' parameter. According to an embodiment, the RU 220 may obtain an original signal from compressed bits based on a 'modCompScaler' parameter. According to an embodiment, the RU 220 may obtain an original signal from compressed bits based on the 'mcscaleoffset' parameter and the 'mcScaleReMask' parameter.

Figure 7A:
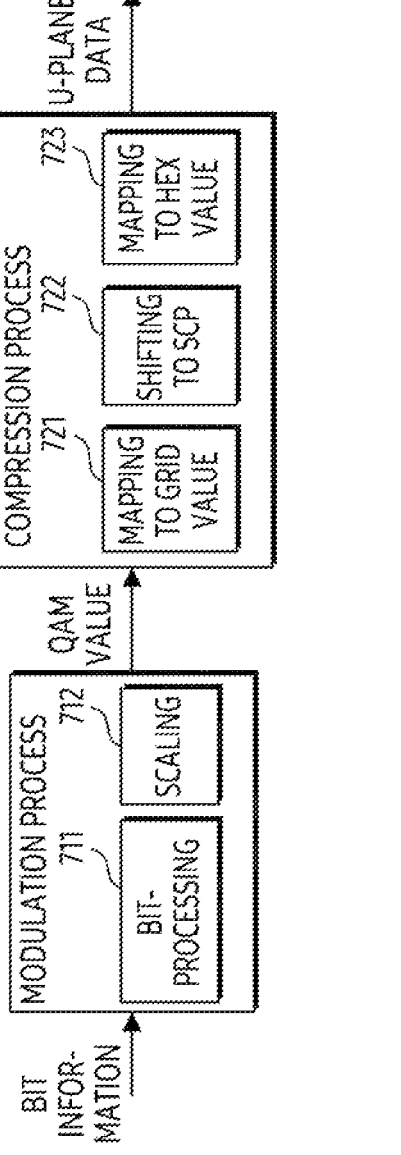
FIG. 7A illustrates an example of a modulation and compression process.

FIG. 7A illustrates an example of a modulation and compression process.

Figure 7B:
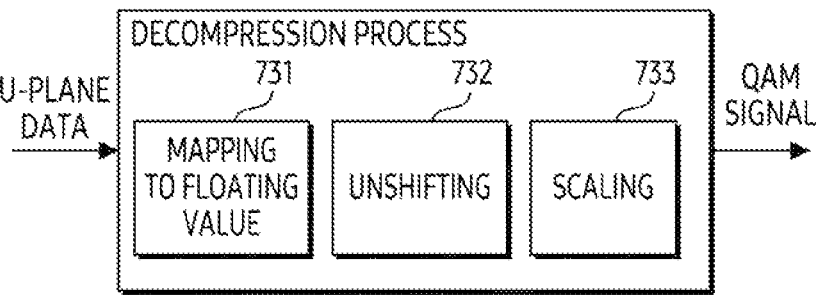
FIG. 7B illustrates an example of a decompression process.

FIG. 7B illustrates an example of a decompression process.

Referring to FIG. 7A and FIG. 7B, the DU 210 (or a processor of the DU 210) may convert (or compress) bit information (or bit-level information) into U-plane data based on modulation process and compression process. The RU 220 (or a processor of the RU 220) may decompress U-plane data based on U-plane data transmitted via the U-plane, and constellation shift flag (e.g., 'csf parameter) and/or scaler value (e.g., modCompScaler' parameter) for U-plane data transmitted via the C-plane. The RU 220 may obtain bit information by restoring the signal compressed in the DU 210.

Referring to FIG. 7A, operations 711 to 723 may be examples of modulation and compression processes. Operations 711 to 723 may be performed by the DU 210.

In operation 711, a bit-processing process may be performed. Based on the bit-processing process, a bit-processing value may be obtained. For example, a bit-processing value may be obtained based on modulation methods (e.g., BPSK, QPSK, 16 QAM, 64 QAM, 256 QAM, and 1024 QAM). The DU 210 (or the processor of the DU 210) may convert bit information into a bit-processing value by performing a bit-processing process. An example of bit-processing values according to a modulation scheme may be set as shown in Table 6.

TABLE 6

| QAM (modulation scheme) | bit-processing value |
| --- | --- |
| BPSK | −1, 0, 1 |
| QPSK | {−1, 1} |
| 16 QAM | {−3, −1, 1, 3} |
| 64 QAM | {−7, −5, . . . 5, 7} |
| 256 QAM | {−15, −13, . . . 13, 15} |
| 1024 QAM | {−31, −29, . . . 29, 31} |

In operation 712, a scaling process may be performed. A designated QAM value (e.g., original QAM value) may be obtained based on the scaling process. The designated QAM value may be obtained based on the scaling process. A bit-processing value may be converted into a designated QAM value based on a scaling process. The DU 210 may convert the bit-processing value into the designated QAM value based on the scaling process.

For example, the scaling process may be performed based on a scaling factor. The DU 210 may perform the scaling process based on the scaling factor. The DU 210 may obtain the designated QAM value based on the scaling process. The designated QAM value may be set (or defined) based on a 3GPP standard. An example of the designated QAM value according to the modulation scheme may be set (or defined) as shown in Table 7.

TABLE 7

| QAM (modulation scheme) | designated QAM value |
| --- | --- |
| BPSK | −1, 0, 1 |
| QPSK | $\left(\frac{1}{\sqrt{2}}\right)\{-1, 1\}$ |

TABLE 7-continued

| QAM (modulation scheme) | designated QAM value |
| --- | --- |
| 16 QAM | $\left(\frac{1}{\sqrt{10}}\right)\{-3, -1, 1, 3\}$ |
| 64 QAM | $\left(\frac{1}{\sqrt{42}}\right)\{-7, -5, \ldots 5, 7\}$ |
| 256 QAM | $\left(\frac{1}{\sqrt{170}}\right)\{-15, -13, \ldots 13, 15\}$ |
| 1024 QAM | $\left(\frac{1}{\sqrt{682}}\right)\{-31, -29, \ldots 29, 31\}$ |

The bit-processing process according to operation 711 and the scaling process according to operation 712 may be referred to as a modulation process. According to the modulation process, the designated QAM value may be obtained.

In operation 721, a mapping process into a grid value may be performed. For example, the DU 210 may map the designated QAM value into the grid value. The DU 210 may obtain a mapped floating value based on mapping the designated QAM value into the grid value. An example of a mapped floating value according to the modulation scheme may be set (or defined) as shown in Table 8.

TABLE 8

| QAM (modulation scheme) | designated QAM value |
| --- | --- |
| BPSK | $\left(\frac{1}{2}\right)\{-1, 0, 1\}$ |
| QPSK | $\left(\frac{1}{2}\right)\{-1, 1\}$ |
| 16 QAM | $\left(\frac{1}{4}\right)\{-3, -1, 1, 3\}$ |
| 64 QAM | $\left(\frac{1}{8}\right)\{-7, -5, \ldots 5, 7\}$ |
| 256 QAM | $\left(\frac{1}{16}\right)\{-15, -13, \ldots 13, 15\}$ |
| 1024 QAM | $\left(\frac{1}{32}\right)\{-31, -29, \ldots 29, 31\}$ |

In operation 722, a shifting process to a shifted constellation point (SCP) may be performed. Based on subtracting a shift value from a mapped floating value, the shifting process to the SCP may be performed. The DU 210 may obtain a shifted value within the SCP based on subtracting a shift value from the mapped floating value. An example of a shift value according to the modulation method and a shifted value in the SCP may be set (or defined) as shown in Table 9.

TABLE 9

| QAM (modulation scheme) | Shift value | Shifted value in SCP |
| --- | --- | --- |
| BPSK | 0 | $\left(\frac{1}{2}\right)\{-1, 0, 1\}$ |
| QPSK | $\frac{1}{2}$ | {−1, 0} |

TABLE 9-continued

| QAM (modulation scheme) | Shift value | Shifted value in SCP |
|---|---|---|
| 16 QAM | $\frac{1}{4}$ | $\left(\frac{1}{2}\right)\{-2, -1, 0, 1\}$ |
| 64 QAM | $\frac{1}{8}$ | $\left(\frac{1}{4}\right)\{-4, -3, \ldots 2, 3\}$ |
| 256 QAM | $\frac{1}{16}$ | $\left(\frac{1}{8}\right)\{-8, -7, \ldots 6, 7\}$ |
| 1024 QAM | $\frac{1}{32}$ | $\left(\frac{1}{16}\right)\{-16, -15, \ldots 15\}$ |

In operation 723, a mapping process into a hexadecimal (HEX) value may be performed. The HEX value may refer to a value converted into a hexadecimal number to transmit data through the U-plane. The DU 210 may map the shifted value in the SCP into a hexadecimal (HEX) value. For example, based on changing an integer value corresponding to the shifted values in the SCP to a two's complement, the shifted value in the SCP may be mapped to the HEX (hexadecimal) value. For example, in 64 QAM, when the shifted value is −1/4, the shifted value in the SCP may be mapped to the HEX value based on changing −1 to 2's component.

For example, a HEX value corresponding to a shifted value in the SCP according to a modulation method may be set (or defined) as shown in Table 10.

TABLE 10

| QAM (modulation scheme) | Shifted value in SCP | Hex value to U-plane |
|---|---|---|
| BPSK | $\left(\frac{1}{2}\right)\{-1, 0, 1\}$ | $\{3, 0, 1\}$ |
| QPSK | $\{-1, 0\}$ | $\{1, 0\}$ |
| 16 QAM | $\left(\frac{1}{2}\right)\{-2, -1, 0, 1\}$ | $\{2, 3, 0, 1\}$ |
| 64 QAM | $\left(\frac{1}{4}\right)\{-4, -3, \ldots 2, 3\}$ | $\{4, \ldots 7, 0, 1, \ldots 3\}$ |
| 256 QAM | $\left(\frac{1}{8}\right)\{-8, -7, \ldots 6, 7\}$ | $\{8, 9, \ldots f, 0, 1, \ldots 7\}$ |
| 1024 QAM | $\left(\frac{1}{16}\right)\{-16, -15, \ldots 15\}$ | $\{10, \ldots 1f, 0, 1, \ldots f\}$ |

The mapping process to a floating value according to operation 721, the shifting process according to operation 722, and the mapping process to a HEX value according to operation 723 may be referred to as a compression process. According to the compression process, U-plane data may be obtained.

The DU 210 may convert bit information (or bit level information) into U-plane data based on operations 711 to 723 described above. The DU 210 may transmit the U-plane data to the RU 220.

Referring to FIG. 7B, operations 731 to 733 may be examples of a decompression process. Operations 731 to 733 may be performed by the RU 220.

In operation 731, a mapping process into a floating value may be performed. For example, the RU 220 may map U-plane data configured based on the HEX value into a floating value. Operation 731 may be a reverse process of operation 723 of FIG. 7A.

In operation 732, an unshifting process may be performed. For example, the RU 220 may unshift a value mapped to a floating value. In the mapped floating value, an unshifting process may be performed based on adding a shift value. The RU 220 may perform the unshifting process by adding a shift value to the mapped floating value. Operation 732 may be an inverse process of operation 722 of FIG. 7A.

In operation 733, a scaling process may be performed. For example, a scaling process may be performed based on the 'modCompScaler' parameter. For example, a scaling process through the parameter 'modCompScaler' may be performed. The RU 220 may perform a scaling process through the 'modCompScaler' parameter. Operation 733 may be an inverse process of at least one of operation 721 and/or operation 712 of FIG. 7A.

Operations 731 to 733 may be referred to as a decompression process. According to the decompression process, a QAM signal may be obtained. The RU 220 may convert U-plane data into a QAM signal based on performing operations 731 to 733.

Referring to FIGS. 7A and 7B, a scaling process, a mapping process, and a shifting process of a signal may be performed during a modulation and compression process. A scaling value and a shifting value used in at least one of the scaling process, the mapping process, and the shifting process may be set in various ways. A compression process and a decompression process may be performed based on a plurality of values used in the scaling process, the mapping process, and the shifting process.

According to the processes (or operations) illustrated in FIGS. 7A and 7B, after a value of constellation points is converted into a floating value, a scaling process and a mapping process may be performed. As the value of constellation points are converted into the floating value, complexity may increase. Accordingly, a feature of a technique for reducing complexity by converting the value of constellation points into a quantized integer value rather than the floating value may be described below.

Figure 8A:
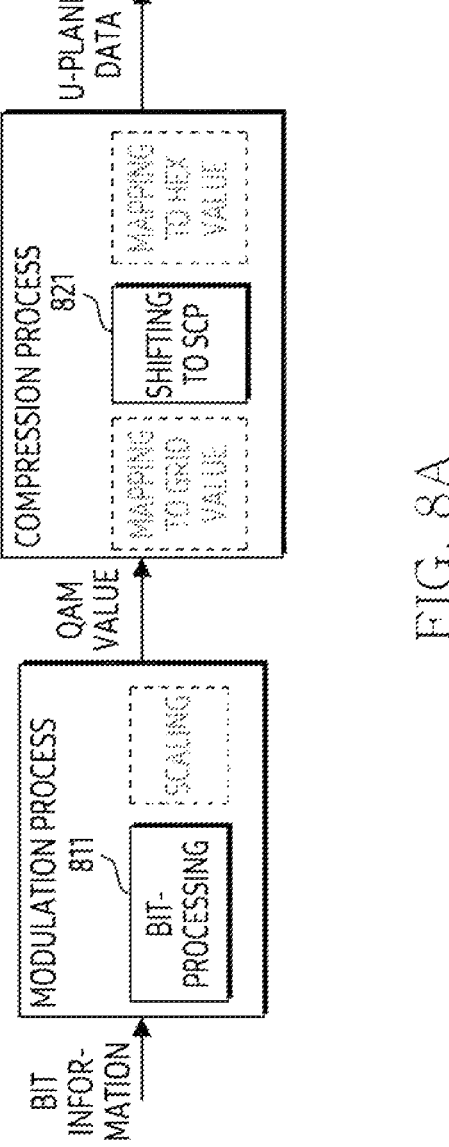
FIG. 8A illustrates an example of a modulation and compression process through a shifting process.

FIG. 8A illustrates an example of a modulation and compression process through a shifting process. The modulation and compression process may be performed by a DU (e.g., the DU 210).

Figure 8B:
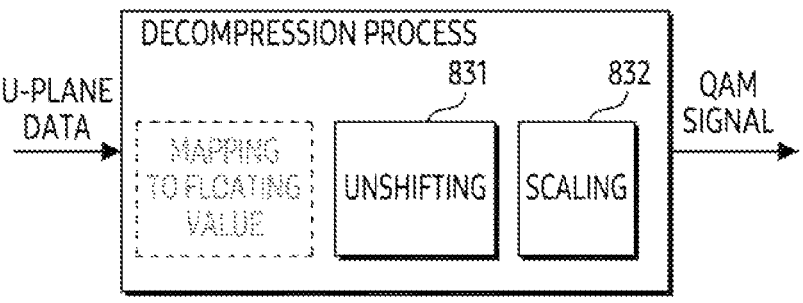
FIG. 8B illustrates an example of a decompression process through an unshifting process.

FIG. 8B illustrates an example of a decompression process through an unshifting process. The decompression process may be performed by an RU (e.g., the RU 220).

Referring to FIGS. 8A and 8B, the DU 210 (e.g., a processor of DU 210) may convert a value of constellation points used in MC scheme into a quantized integer value rather than a floating value. By converting the value of constellation points used in the MC scheme into the quantized integer value rather than the floating value, at least one of the compression process, the decompression process, the scaling process, and/or the mapping process may be simplified. In addition, at least one of the compression process, the decompression process, the scaling process, and/or the mapping process may be easily implemented and interpreted. For example, an example of quantized constellation points according to the modulation method may be set (or defined) as shown in Table 11.

TABLE 11

| Quantized constellation points per MCS | | | |
|---|---|---|---|
| BPSK | QPSK | 16-QAM | 64-QAM |
| −1 | −1 | −3 | −7 |
| 0 | 1 | −1 | −5 |
| 1 | | 1 | −3 |
| | | 3 | −1 |
| | | | 1 |
| | | | 3 |
| | | | 5 |
| | | | 7 |

Referring to Table 11, constellation points according to BPSK modulation may be set (or defined) to {−1, 0, 1}. Constellation points according to QPSK modulation may be set (or defined) to {−1, 1}. Constellation points according to 16 QAM may be set (or defined) to {−3, −1, 1, 3}. Constellation points according to 64 QAM may be set (or defined) to {−7, −5, −3, −1, 1, 3, 5, 7}. Table 11 is exemplary and quantized constellation points according to various modulation schemes may be set (or defined).

According to an embodiment, the quantized constellation points may be shifted. An example of quantized and shifted constellation points may be set (or defined) as shown in Table 12.

TABLE 12

| Quantized shifted constellation point | | | |
|---|---|---|---|
| BPSK | QPSK | 16-QAM | 64-QAM |
| −1 | −1 | −2 | −4 |
| 0 | 0 | −1 | −3 |
| 1 | | 0 | −2 |
| | | 1 | −1 |
| | | | 0 |
| | | | 1 |
| | | | 2 |
| | | | 3 |

Referring to Table 12, quantized and shifted constellation points according to BPSK modulation may be set (or defined) to {−1, 0, 1}. Quantized and shifted constellation points according to QPSK modulation may be set (or defined) to {−1,0}. Quantized and shifted constellation points according to 16 QAM may be set (or defined) to {−2, −1, 0, 1}. Quantized and shifted constellation points according to 64 QAM may be set (or defined) to {−4, −3, −2, −1, 0, 1, 2, 3}. Table 12 is exemplary, quantized and shifted constellation points according to various modulation schemes may be set or defined.

A modulation process and a compression process may be performed based on the quantized constellation points shown in Tables 11 and 12. A decompression process may be performed based on the quantized constellation points shown in Tables 11 and 12. FIG. 8A illustrates an example of a modulation process and a compression process in the DU 210. FIG. 8B illustrates an example of a decompression process in the RU 220.

Referring to FIG. 8A, operations 811 and 821 may be examples of modulation and compression processes. Operations 811 to 821 may be performed by the DU 210.

In operation 811, a bit-processing process may be performed. Based on the bit-processing process, a bit-processing value may be obtained. For example, a bit-processing value may be obtained based on a modulation method (e.g., BPSK, QPSK, 16 QAM, 64 QAM, 256 QAM, and 1024

QAM). The DU 210 (or the processor of the DU 210) may convert bit information into a bit-processing value by performing a bit-processing process. The DU 210 may obtain a QAM value based on a bit-processing process. Unlike operations 711 to 713 of FIG. 7A, the DU 210 may obtain a QAM value based on performing only a bit-processing process without a scaling process.

For example, an example of a bit-processing value according to a modulation scheme may be set as shown in Table 13.

TABLE 13

| QAM (modulation scheme) | bit-processing value |
|---|---|
| BPSK | −1, 0, 1 |
| QPSK | {−1, 1} |
| 16 QAM | {−3, −1, 1, 3} |
| 64 QAM | {−7, −5, . . . 5, 7} |
| 256 QAM | {−15, −13, . . . 13, 15} |
| 1024 QAM | {−31, −29, . . . 29, 31} |

The bit-processing process according to operation 811 described above may be referred to as a modulation process. According to the modulation process, a QAM value may be obtained.

In operation 821, a shifting process to a quantized SCP may be performed. For example, the DU 210 may perform the shifting process to the quantized SCP based on a designated shifting algorithm. The designated shifting algorithm may be set differently according to the modulation scheme.

For example, when the QAM value is X and BPSK modulation is applied, the X may be obtained according to the shifting process to the quantized SCP. For example, when the QAM value is X and QPSK modulation is applied, $$\frac{X-1}{2}$$

may be obtained according to the shifting process to the quantized SCP. For example, when the QAM value is X and 16 QAM modulation is applied, $$\frac{X-1}{2}$$

may be obtained according to the shifting process to the quantized SCP. For example, when the QAM value is X and 64 QAM modulation is applied, $$\frac{X-1}{2}$$

may be obtained according to the shifting process to the quantized SCP. For example, when the QAM value is X and 256 QAM modulation is applied, $$\frac{X-1}{2}$$

may be obtained according to the shifting process to the quantized SCP. For example, when the QAM value is X and 1024 QAM modulation is applied, $$\frac{X-1}{2}$$

may be obtained according to the shifting process to the quantized SCP.

An example of a shifted value in the quantized SCP according to the above-described example may be set (or defined) as shown in Table 14.

TABLE 14

| QAM (modulation scheme) | Shifting operation | Shifted value in quantized SCP |
|---|---|---|
| BPSK | X | {1, 0, 1} |
| QPSK | $\frac{X-1}{2}$ | {−1, 0} |
| 16 QAM | $\frac{X-1}{2}$ | {−2, −1, 0, 1} |
| 64 QAM | $\frac{X-1}{2}$ | {−4, −3, . . . 2, 3} |
| 256 QAM | $\frac{X-1}{2}$ | {−8, −7, . . . , 6, 7} |
| 1024 QAM | $\frac{X-1}{2}$ | {−16, −15, . . . 15} |

Referring to Table 14, when the constellation shift flag is set to 1 and BPSK modulation is applied, the QAM value may be shifted to the same value. When the constellation shift flag is set to 1 and the remaining modulation schemes (e.g., QPSK, 16 QAM, 64 QAM, 256 QAM, and 1024 QAM) except for the BPSK modulation are applied, the QAM value may be shifted based on Equation 5.

$$Y = \frac{X-1}{2} \qquad \text{[Equation 5]}$$

Referring to Equation 5, Y refer to a shifted value. X refer to the QAM value.

The shifted value in the quantized SCP may be converted into a hexadecimal (HEX) value. An example in which the shifted value in the quantized SCP is converted into an HEX value may be set as shown in Table 15.

TABLE 15

| QAM (modulation scheme) | Shifted value in quantized SCP | Hex value to U-plane |
|---|---|---|
| BPSK | {1, 0, 1} | {3, 0, 1} |
| QPSK | {−1, 0} | {1, 0} |
| 16 QAM | {−2, −1, 0, 1} | {2, 3, 0, 1} |
| 64 QAM | {−4, −3, . . . 2, 3} | {4, . . . 7, 0, 1, . . . 3} |
| 256 QAM | {−8, −7, . . . , 6, 7} | {8, 9, . . . f, 0, 1, . . . 7} |
| 1024 QAM | {−16, −15, . . . 15} | {10, . . . 1f, 0, 1, . . . f} |

The shifting process to the quantized SCP according to operation 821 may be referred to as a compression process. According to the compression process, U-plane data may be obtained.

The DU 210 may convert bit information (or bit level information) into U-plane data based on operations 811 and 821 described above. The DU 210 may transmit U-plane data to the RU 220.

In FIG. 8B, operation 831 and operation 832 may be examples of a decompression process. Operation 831 may be performed by the RU 220.

In operation 831, an unshifting process may be performed. For example, when the constellation shift flag is set to 1 and BPSK modulation is applied, U-plane data may be unshifted to the same value. For example, when the constellation shift flag is set to 1 and the remaining modulation schemes (e.g., QPSK, 16 QAM, 64 QAM, 256 QAM, and 1024 QAM) except for BPSK modulation are applied, the U-plane data may be unshifted based on Equation 6.

$$Y = 2X + 1 \qquad \text{[Equation 6]}$$

In operation 832, a scaling process may be performed. For example, the RU 220 may perform a scaling process to transmit a signal to a terminal related to the RU 220 (e.g., the terminal located in a cell of the RU 220).

Operation 831 and operation 832 may be referred to as a decompression process. According to the decompression process, a QAM signal may be obtained. The RU 220 may convert U-plane data into a QAM signal based on performing operations 831 and 832.

According to an embodiment, an operation for decompressing the RU 220 may be represented as a pseudo code as shown in Table 16.

TABLE 16

1. Read iqSample as an udIqWidth bit vector in the U-plane message [this is all the IQ data in the data section]
2. Map iqSample $[0, 2^{udIqWidth} - 1]$ to iqSampleFx $[-2^{udIqWidth-1}, 2^{udIqWidth-1} - 1]$ [this is the normal two's-complement representation of the I and Q samples].
3X. For each RE in the PRB (using Section Extension =4):
3Xa: fetch the "csf" and "modCompScaler" values for which this RE has a "1" in the reMask
3Xb. If "csf" == 1 then iqSampleFx = iqSampleFx × 2 + 1 [this is "unshifting" the constellation point].
3Xc. iqSampleScaled = modCompScaler × iqSampleFx × √2 [this scales the constellation point]
3Y. For each RE in the PRB (using Section Extension =5):
3Ya: fetch the "csf" and "mcScaleOffset" values for which this RE has a "1" in the relevant mcScaleReMask
3Yb. If "csf" == 1 then iqSampleFx = iqSampleFx × 2 + 1 [this is "unshifting" the constellation point].
3Yc. iqSampleScaled = mcScaleOffset × iqSampleFx × √2 [this scales the constellation point]
After decompression, | iqSampleScaled | shall be ≤ 1 and a value of | iqSampleScaled | = 1.0 matches 0 dBFS.

Figure 6A:
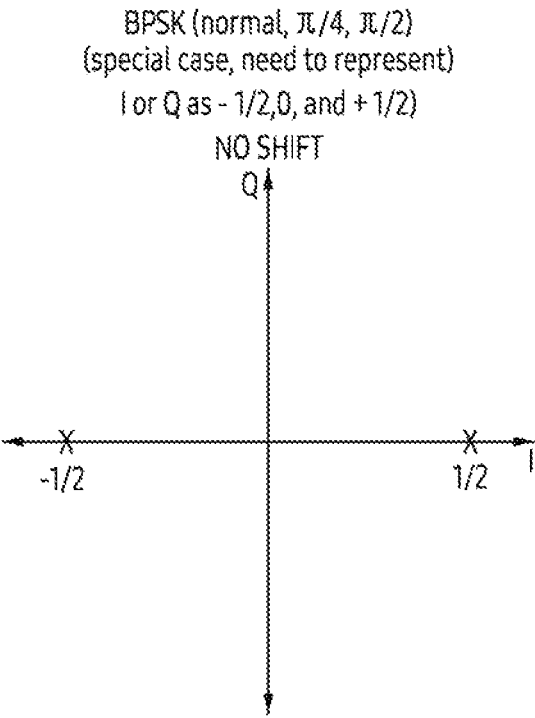
FIGS. 6A to 6D illustrate shifted constellation points for each MCS.
Figure 6B:
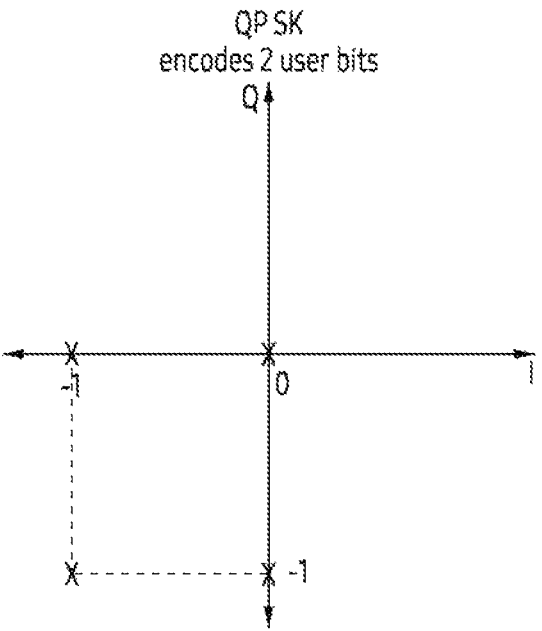
Figure 6C:
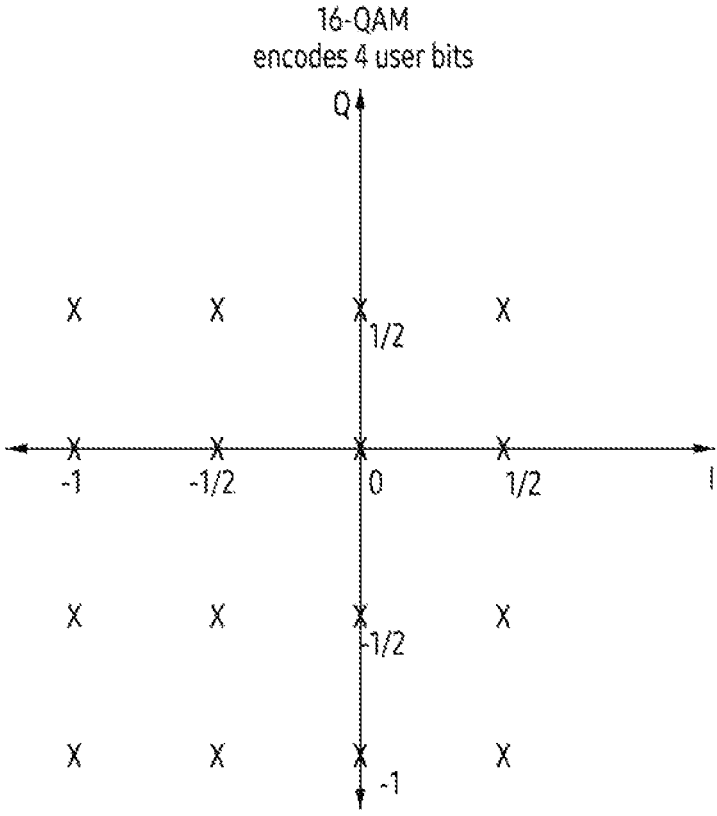
Figure 6D:
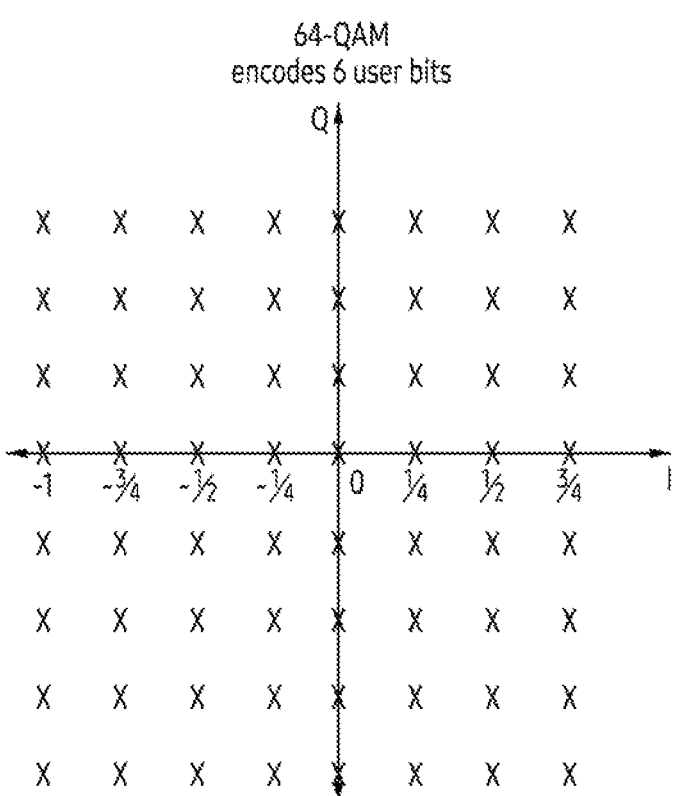

According to the MC scheme according to FIGS. 5A and 6D, a rule in which 'csf' is applied only to the highest MCS in the mixed-MCS case is applied. When quantized SCP is used, a rule in which 'csf' is applied only to the highest MCS in the mixed-MCS case described in FIGS. 5A to 6D may not be applied. When quantized SCP is used, DU 210 and RU 220 may process a signal according to the mixed-MCS case without applying the rule.

For example, the DU 210 and the RU 220 may have backward compatibility by supporting the rule, and process a signal according to the mixed-MCS case through a simple and unified algorithm by not using the rule. Unlike a case where a shifting value and an unshifting value are determined according to the MCS or 'udIqWidth' value when the shifting processes and unshifting processes are performed, a shifting process and/or scaling process may be performed according to Equation 5 described above, and an unshifting process and/or scaling process may be performed according to Equation 6 described above.

According to an embodiment, a new field value may be defined as shown in Table 17 in the 'udcompMeth' parameter used in the M-plane, C-plane, and/or U-plane for supporting the MC scheme according to FIGS. 8A and 8B.

cessing unit 911 may generate an M-plane message including information on whether to support the MC scheme according to FIGS. 8A and 8B.

For example, the M-plane message processing unit 911 may generate an M-plane message including information indicating that the MC scheme according to FIGS. 8A and 8B is applied to the U-plane message to be transmitted. For example, the DU 210 may determine to apply the MC scheme according to FIG. 8A and FIG. 8B to data to be transmitted through a U-plane message. The DU 210 may generate an M-plane message including information indicating that the MC scheme according to FIGS. 8A and 8B is applied, by using the M-plane message processing unit 911. The M-plane message processing unit 911 may receive the M-plane message from the RU 220. The DU 210 may perform a negotiation protocol by exchanging management information with the RU 220, by using the M-plane message processing unit 921. For example, the C-plane message generating unit 915 may generate a C-plane message including Section Extension 4 as shown in Table 3. In addition, for example, the C-plane message generating unit 915 may generate a C-plane message including Section Extension 5 as shown in Table 4 or Table 5. For example, the U-plane

TABLE 17

| udCompMeth | compression method | udIqWidth meaning |
|---|---|---|
| 0000b | no compression | bitwidth of each uncompressed I and Q value |
| 0001b | Block floating point (BFP) | bitwidth of each I and Q mantissa value |
| 0010b | Block scaling | bitwidth of each I and Q scaled value |
| 0011b | μ -law | bitwidth of each compressed I and Q value |
| 0100b | Modulation compression | bitwidth of each compressed I and Q value |
| 0101b | BFP + selective RE sending | bitwidth of each compressed I and Q value |
| 0110b | Mod-compr + selective RE sending | bitwidth of each compressed I and Q value |
| 0111b | Quantized SCP modulation compression | bitwidth of each compressed I and Q value |
| 1000b | QSCP mod-compr + selective RE sending | bitwidth of each compressed I and Q value |
| 1001b-1111b | Reserved for further methods | depends on the specific compression method |

Referring to Table 17, when an MC scheme (or compression scheme) based on quantized SCP is used, a value of 'udCompMeth' may be set to 0111b. When selective RE-sending is used along with the MC scheme (or compression scheme), based on quantized SCP, the value of 'udCompMeth' may be set to 1000b.

According to an embodiment, an M-plane parameter for supporting the MC scheme according to FIGS. 8A and 8B may be configured. A negotiation protocol between the DU and the RU for supporting the MC scheme according to FIGS. 8A and 8B may be set.

For example, at least one parameter (e.g., M-plane parameter) for identifying to whether the DU and RU support the MC scheme according to FIGS. 8A and 8B may be configured. A delivery and negotiation protocol for exchanging the at least one parameter (e.g., the M-plane parameter) between the DU and the RU may be established.

Figure 9:
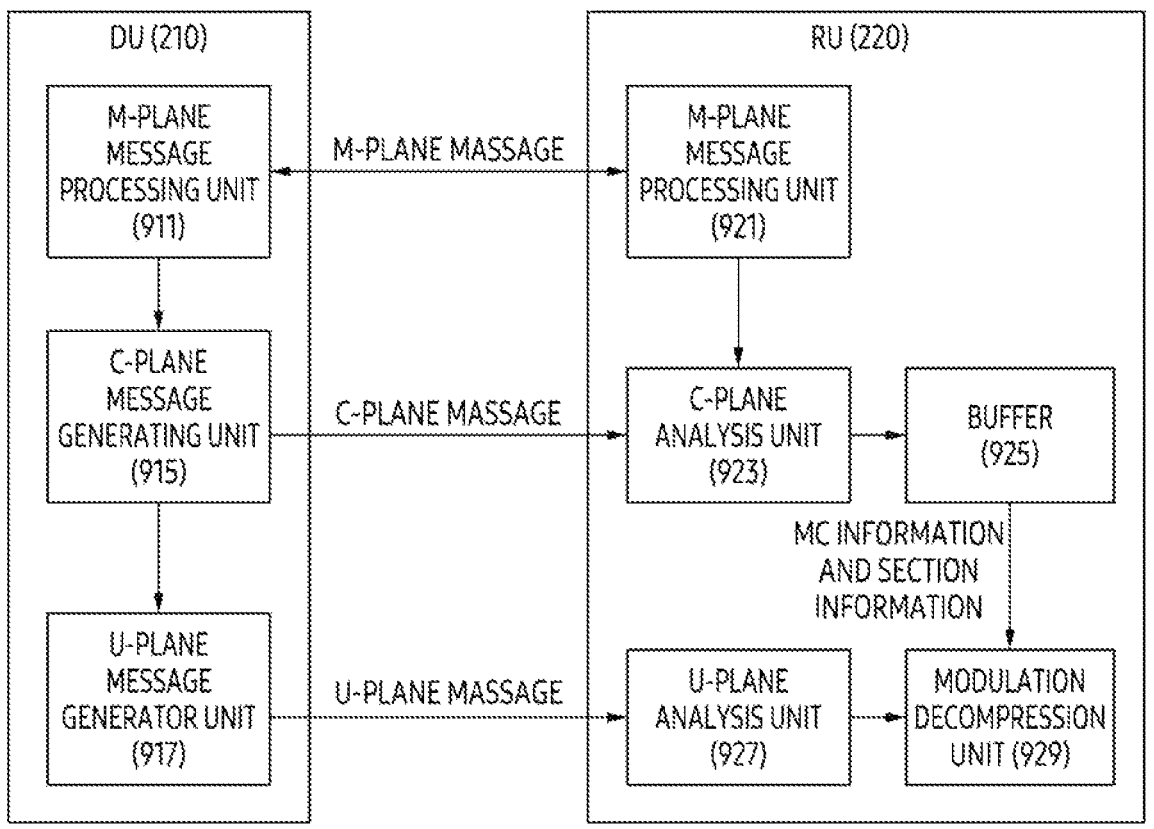
FIG. 9 illustrates an example of operations of a DU and a RU.

FIG. 9 illustrates an example of an operation of DU and RU according to application of modulation compression.

Terms such as ' . . . unit' and ' . . . er' used below refer to a unit that processes at least one function or operation, which may be implemented by hardware, software, or a combination of hardware and software.

Referring to FIG. 9, the DU 210 may include an M-plane message processing unit 911, a C-plane message generating unit 915, and a U-plane message generating unit 917. According to an embodiment, the M-plane message promessage generating unit 917 may generate a U-plane message including I component and Q component according to the MC scheme described in FIGS. 8A and 8B.

The RU 220 may include an M-plane message processing unit 921, a C-plane analysis unit 923, a buffer 925, a U-plane analysis unit 927, and a modulation decompression unit 929.

For example, the M-plane message processing unit 921 may receive the M-plane message from the DU 210. The M-plane message processing unit 921 may obtain information indicating that the MC scheme according to FIGS. 8A and 8B is applied to the U-plane message to be received through the M-plane message. The M-plane message processing unit 921 may generate an M-plane message. The M-plane message processing unit 921 may transmit a generated M-plane message to the DU 210. The RU 220 may perform a negotiation protocol by exchanging management information with the DU 210 by using the M-plane message processing unit 921.

For example, the C-plane analysis unit 923 may receive a C-plane message from the DU 210. The C-plane analysis unit 923 may obtain parameters(s) related to modulation compression from section extension information (e.g., Section Extension 4, Section Extension 5) included in the C-plane message. The C-plane analysis unit 923 may obtain section information from the C-plane message. The C-plane analysis unit 923 may store the parameter(s) related to the modulation compression and the section information in the buffer 925. The U-plane analysis unit 927 may receive a U-plane message from the DU 210. The U-plane analysis unit 927 may include I component and Q component included in the U-plane message. The modulation decompression unit 929 may obtain parameter(s) related to the modulation compression and section information from the buffer 925. The modulation decompression unit 929 may obtain I component and Q component from the U-plane analysis unit 927. The modulation decompression unit 929 may obtain a bit string for the I component and a bit string for the Q component, based on parameters related to the modulation compression. For example, when decompressing, the modulation decompression unit 929 may unshift constellation according to a 'csf' value. The modulation decompression unit 929 may unshift the constellation according to a modulation method. For example, when BPSK is applied, the modulation decompression unit 929 may maintain the same constellation. For example, when the remaining modulation method except for BPSK is applied, the modulation decompression unit 929 may unshift the constellation according to Equation 6. The modulation decompression unit 929 may unshift the constellation according to the modulation scheme, and apply a scale factor for a constellation type shown in the section. For example, several modulation schemes is present in one section. The modulation type may be inferred from the reMask bits. In the reMask bits, each 1 bit represents a shift command ('csf') and a scale factor (e.g. 'modCompScaler' when using section extension 4, 'mcScaleOffset' when using section extension 5) for REs of the PRB.

Although not illustrated, according to an embodiment, the RU 220 may transmit capability information on the MC scheme according to FIGS. 8A and 8B to the DU 210.

According to an embodiment, the DU 210 may modulate and compress data using the MC scheme according to FIGS. 8A and 8B, and transmit the modulated and compressed data to the RU 220. The RU 220 may restore the modulated and compressed data using the MC scheme. According to the MC scheme, the decompression process may be simplified through a simple parameter (or algorithm). In addition, in the mixed-MCS case, a complexity of a system including the DU 210 and the RU 220 may be reduced by avoiding the application of a rule that apply 'csf' only to the highest MCS.

Figure 10:
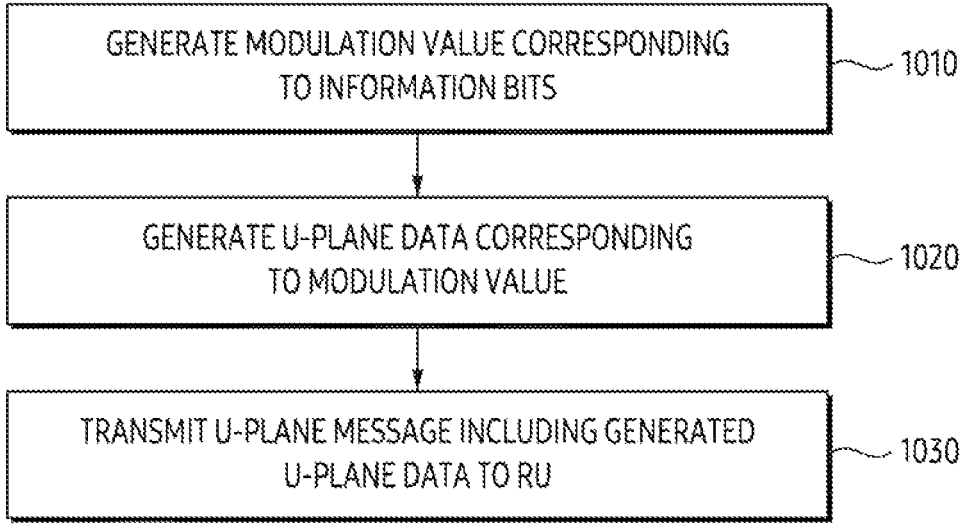
FIG. 10 illustrates a flowchart of operations of a DU.

FIG. 10 illustrates a flowchart of operations of a DU.

Referring to FIG. 10, in operation 1010, the DU 210 (or the processor of the DU 210) may generate a modulation value corresponding to information bits. For example, the DU 210 may generate the modulation value corresponding to information bits based on the modulation compression scheme. For example, the modulation compression scheme may include one of BPSK, QPSK, 16 QAM, 64 QAM, 256 QAM, and 1024 QAM.

For example, the DU 210 may generate the modulation value corresponding to information bits based on a bit-processing process related to the modulation compression scheme. For example, the DU 210 may generate a modulation value corresponding to information bits without scaling. The modulation value may be generated without scaling based on information bits. For example, operation 1010 may correspond to operation 811 of FIG. 8.

In operation 1020, the DU 210 may generate U-plane data corresponding to the modulation value. For example, the DU 210 may generate U-plane data corresponding to the modulation value, based on a shifting operation corresponding to the modulation compression scheme.

For example, in case of BPSK, the modulation compression scheme may be set to perform a shifting operation based on a designated first equation. For example, the designated first equation may be set to Y=X. In the designated first equation, X is a modulation value, and Y is a shifted value.

For example, in case of not BPSK (e.g., in case of QPSK, 16 QAM, 64 QAM, 256 QAM, and 1024 QAM), The modulation compression scheme may be set to perform the shifting operation based on a designated second equation. For example, the designated second equation may be set to $$Y = \frac{X-1}{2}.$$

In the designated second equation, X is a modulation value, and Y is a shifted value.

For example, the U-plane data may include a hexadecimal (HEX) value obtained based on the shifted value. The DU 210 may obtain a shifted value using one of the designated first equation and the designated second equation. The DU 210 may obtain an HEX value included in the U-plane data based on the shifted value. For example, the modulation value, the shifted value, and the HEX value may all be set as integers.

In operation 1030, the DU 210 may transmit a U-plane message including the generated U-plane data to the RU 220. For example, the DU 210 may transmit a U-plane message including the generated U-plane data to the RU 220 through a fronthaul interface. For example, the DU may transmit a U-plane message configured according to the above-described embodiments to the RU.

For example, the DU 210 may transmit information instructing to perform a shifting operation to the RU 220 through a C-plane message. The C-plane message may include section extension information. The section extension information may include constellation shift flag (csf) set to 1.

Figure 11:
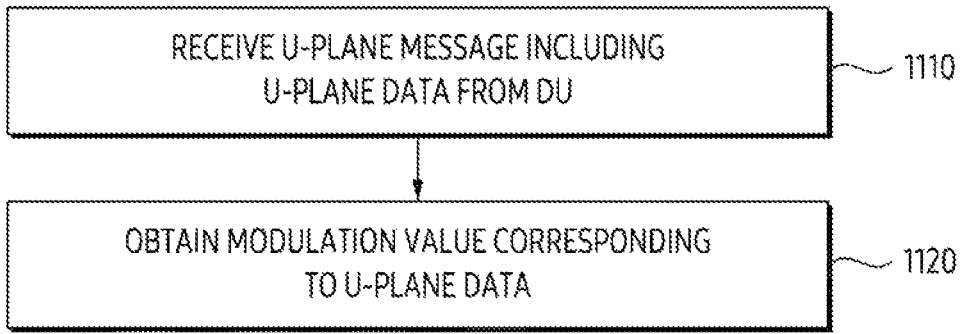
FIG. 11 illustrates a flowchart of operations of a RU.

FIG. 11 illustrates a flowchart of operations of a RU.

Referring to FIG. 11, in operation 1110, the RU 220 (or the processor of the RU 220) may receive a U-plane message including U-plane data from the DU 210. For example, the RU 220 may receive a U-plane message including U-plane data from the DU 210 through the fronthaul interface.

For example, the RU 220 may receive from the DU 210 through a C-plane message including information to instructing to perform a shifting operation. For example, the C-plane message may include section extension information. The section extension information may include constellation shift flag (csf) set to 1. After receiving the C-plane message, the RU 220 may receive the U-plane message.

In operation 1120, the RU 220 may obtain a modulation value corresponding to the U-plane data. For example, the RU 220 may obtain a modulation value corresponding to the U-plane data, based on a shifting operation corresponding to the modulation compression scheme. For example, the modulation value may be generated without scaling, based on information bits in the DU 210.

For example, the U-plane data may include a hexadecimal (HEX) value. The HEX value may be a value set based on hexadecimal numbers. The RU 220 may obtain a shifted value based on converting the HEX value into a decimal number.

The RU 220 may obtain a modulation value through a shifted value using one of the designated first equation and the designated second equation. The RU 220 may obtain a shifted value and obtain a modulation value based on the HEX value included in the U-plane data. For example, the modulation value, the shifted value, and the HEX value may all be set as integers.

For example, in the case of BPSK, the modulation compression scheme may be set to perform a shifting operation based on the designated first equation. For example, the designated first equation may be set to Y=X. In the designated first equation, X is a shifted value, and Y is a modulation value.

In case of not BPSK (e.g., in case of QPSK, 16 QAM, 64 QAM, 256 QAM, and 1024 QAM), based on the designated second equation, the modulation compression scheme may be set to perform the shifting operation. For example, the designated second equation may be set to Y=2X+1 In the designated second equation, X is a shifted value, and Y is a modulation value.

The effects that can be obtained from the disclosure are not limited to those described above, and any other effects not mentioned herein will be clearly understood by those having ordinary knowledge in the art to which the disclosure belongs, from the following description.

According to an embodiment, a method for a distributed unit (DU) may comprise generating, based on a modulation compression scheme, a modulation value corresponding to information bits. The method may comprise generating user plane (U-plane) data corresponding to the modulation value based on a shifting operation corresponding to the modulation compression scheme. The method may comprise transmitting a U-plane message including the generated U-plane data to a radio unit (RU) through a fronthaul interface. The modulation compression scheme may be set to perform the shifting operation based on a designated first equation in case of binary phase shift keying (BPSK), and set to perform the shifting operation based on a designated second equation, in case of not BPSK.

According to an embodiment, the designated first equation may be set to Y=X. The designated second equation may be set to $$Y = \frac{X-1}{2}.$$

In the designated first equation and the designated second equation, X may be the modulation value, and Y may be a shifted value.

According to an embodiment, the U-plane data may comprise hexadecimal (HEX) value obtained based on the shifted value. The modulation value, the shifted value, and HEX value may be set to integer.

According to an embodiment, the HEX value may be obtained based on calculation of the modulation value rather than mapping the modulation value.

According to an embodiment, the modulation value may be generated without scaling, based on the information bits.

According to an embodiment, the method may comprise transmitting information indicating to perform the shifting operation to the RU through a control plane (C-plane) message. The C-plane message may comprise section extension information. The section extension information may comprise constellation shift flag (csf) set to one (1).

According to an embodiment, in order to obtain U-plane data, a shift value defined as a fraction value may not be used.

According to an embodiment, an electronic device performed by a distributed unit (DU) may comprise at least one transceiver comprising a fronthaul transceiver, and at least one processor coupled with the at least one transceiver. The at least one processor may be configured to generate, based on a modulation compression scheme, a modulation value corresponding to information bits. The at least one processor may be configured to generate user plane (U-plane) data corresponding to the modulation value based on a shifting operation corresponding to the modulation compression scheme. The at least one processor may be configured to transmit a U-plane message including the generated U-plane data to a radio unit (RU) through a fronthaul interface. The modulation compression scheme may be set to perform the shifting operation based on a designated first equation in case of binary phase shift keying (BPSK), and set to perform the shifting operation based on a designated second equation, in case of not BPSK.

According to an embodiment, the designated first equation may be set to Y=X. The designated second equation may be set to $$Y = \frac{X-1}{2}.$$

In the designated first equation and the designated second equation X may be the modulation value and Y may be a shifted value.

According to an embodiment, the U-plane data may comprise hexadecimal (HEX) value obtained based on the shifted value. The modulation value, the shifted value, and HEX value may be set to integer.

According to an embodiment, the HEX value may be obtained based on calculation of the modulation value rather than mapping the modulation value.

According to an embodiment, the modulation value may be generated without scaling, based on the information bits.

According to an embodiment, the at least one processor may be configured to transmit information indicating to perform the shifting operation to the RU through a control plane (C-plane) message. The C-plane message may comprise section extension information. The section extension information may comprise constellation shift flag (csf) set to one (1).

According to an embodiment, in order to obtain U-plane data, a shift value defined as a fraction value may not be used.

According to an embodiment, a method for radio unit (RU) may comprise receiving a user plane (U-plane) message including U-plane data from a distributed unit (DU) through a fronthaul interface. The method may comprise obtaining, based on shifting operation corresponding to a modulation compression scheme, a modulation value corresponding to U-plane data. The modulation compression scheme may be set to perform the shifting operation based on a designated first equation in case of binary phase shift keying (BPSK), and set to perform the shifting operation based on a designated second equation, in case of not BPSK.

According to an embodiment, the designated first equation may be set to Y=X. The designated second equation may be set to $$Y = \frac{X-1}{2}.$$

In the designated first equation and the designated second equation, X may be the shifted value, and Y may be a modulation value.

According to an embodiment, the U-plane data may comprise hexadecimal (HEX) value obtained based on the shifted value. The modulation value, the shifted value, and HEX value may be set to integer.

According to an embodiment, the HEX value may be obtained based on calculation of the modulation value rather than mapping the modulation value.

According to an embodiment, the modulation value may be generated without scaling, based on the information bits.

According to an embodiment, the method may comprise receiving information indicating to perform the shifting operation through a control plane (C-plane) message. The C-plane message may comprise section extension information. The section extension information may comprise constellation shift flag (csf) set to one (1).

According to an embodiment, in order to obtain U-plane data, a shift value defined as a fraction value may not be used.

According to an embodiment, an electronic device performed by a radio unit (RU) may comprise at least one transceiver comprising a fronthaul transceiver and at least one processor coupled with the at least one transceiver. The at least one processor may be configured to receive a user plane (U-plane) message including U-plane data from a distributed unit (DU) through a fronthaul interface. The at least one processor may be configured to obtain, based on shifting operation corresponding to a modulation compression scheme, a modulation value corresponding to U-plane data. The modulation compression scheme may be set to perform the shifting operation based on a designated first equation in case of binary phase shift keying (BPSK), and set to perform the shifting operation based on a designated second equation, in case of not BPSK.

According to an embodiment, the designated first equation may be set to Y=X. The designated second equation may be set to $$Y = \frac{X-1}{2}.$$

In the designated first equation and the designated second equation, X may be the shifted value, and Y may be a modulation value.

According to an embodiment, the U-plane data may comprise hexadecimal (HEX) value obtained based on the shifted value. The modulation value, the shifted value, and HEX value may be set to integer.

According to an embodiment, the HEX value may be obtained based on calculation of the modulation value rather than mapping the modulation value.

According to an embodiment, the modulation value may be generated without scaling, based on the information bits.

According to an embodiment, the at least one processor may be configured to receive information indicating to perform the shifting operation through a control plane (C-plane) message. The C-plane message may comprise section extension information. The section extension information may comprise constellation shift flag (csf) set to one (1).

According to an embodiment, in order to obtain U-plane data, a shift value defined as a fraction value may not be used.

Methods according to the embodiments described in the claims or the specification of the disclosure may be implemented in the form of hardware, software, or a combination of hardware and software.

When implemented as software, a computer-readable storage medium storing one or more program (software module) may be provided. The one or more program stored in the computer-readable storage medium is configured for execution by one or more processor in the electronic device. The one or more program include instructions that cause the electronic device to execute methods according to embodiments described in the claim or the specification of the disclosure. The one or more programs may be included in a computer program product and provided. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Such program (software modules, software) may be stored in random access memory, non-volatile memory including flash memory, read only memory (ROM), electrically erasable programmable read only memory (EEPROM), magnetic disc storage device, compact disc-ROM (CD-ROM), digital versatile disc (DVD) or other form of optical storage, magnetic cassette. Alternatively, it may be stored in a memory configured with some or all combinations thereof. In addition, each configuration memory may be included a plurality.

In addition, the program may be stored in an attachable storage device that may be accessed through a communication network, such as the Internet, Intranet, local area network (LAN), wide area network (WAN), or storage area network (SAN), or a combination thereof. Such a storage device may be connected to a device performing an embodiment of the disclosure through an external port. In addition, a separate storage device on the communication network may access a device performing an embodiment of the disclosure.

In the above-described specific embodiments of the disclosure, the component included in the disclosure is expressed in singular or plural according to the presented specific embodiment. However, singular or plural expression is chosen appropriately for the situation presented and the disclosure is not limited to singular or plural component, and even if the component is expressed in plural, it may be configured with singular, or even if it is expressed in singular, it may be configured with plural.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the detailed description of the disclosure, the specific embodiment have been described, but it goes without saying that various modification is possible within the limit not departing from the scope of the disclosure.

What is claimed is:

1. A method performed by a distributed unit (DU), the method comprising:

generating, based on a modulation compression scheme, a modulation value corresponding to information bits;

generating, based on a shifting operation corresponding to the modulation compression scheme, user plane (U-plane) data corresponding to the modulation value; and transmitting, to a radio unit (RU) through a fronthaul interface, a U-plane message comprising the generated U-plane data, wherein, in case of the modulation compression scheme being binary phase shift keying (BPSK), the shifting operation is performed based on a first equation, wherein, in case of the modulation compression scheme being any one of schemes other than BPSK, the shifting operation is performed based on a second equation different from the first equation, wherein the modulation value is converted to a shifted value based on the shifting operation, wherein the shifted value is converted to a hexadecimal (HEX) value, wherein the U-plane data includes the HEX value, and wherein the modulation value, the shifted value, and the HEX value are set to integers.

2. The method of claim 1, wherein the first equation is set to Y=X, wherein the second equation is set to $$Y = \frac{X-1}{2},$$

wherein X is the modulation value, and wherein Y is the shifted value.

3. The method of claim 1, wherein the modulation value is obtained without scaling, based on the information bits.

4. The method of claim 1, further comprising:

transmitting, to the RU through a control plane (C-plane) message, information indicating how to perform the shifting operation, wherein the C-plane message comprises section extension information, and wherein the section extension information comprises a constellation shift flag (csf) that is set to one (1).

5. An electronic device comprising:

at least one transceiver comprising a fronthaul transceiver; and at least one processor coupled with the at least one transceiver, wherein the at least one processor is configured to:

generate, based on a modulation compression scheme, a modulation value corresponding to information bits;

generate, based on a shifting operation corresponding to the modulation compression scheme, user plane (U-plane) data corresponding to the modulation value; and transmit, to a radio unit (RU) through a fronthaul interface, a U-plane message comprising the generated U-plane data, wherein, in case of the modulation compression scheme being binary phase shift keying (BPSK), the shifting operation is performed based on a first equation, wherein, in case of the modulation compression scheme being any one of schemes other than BPSK, the shifting operation is performed based on a second equation different from the first equation, wherein the modulation value is converted to a shifted value based on the shifting operation, wherein the shifted value is converted to a hexadecimal (HEX) value, wherein the U-plane data includes the HEX value, and wherein the modulation value, the shifted value, and the HEX value are set to integers.

6. The electronic device of claim 5, wherein the first equation is set to Y=X, wherein the second equation is set to $$Y = \frac{X-1}{2},$$

wherein X is the modulation value, and wherein Y is the shifted value.

7. The electronic device of claim 5, wherein the modulation value is obtained without scaling, based on the information bits.

8. The electronic device of claim 5, wherein the at least one processor is further configured to transmit, to the RU through a control plane (C-plane) message, information indicating how to perform the shifting operation, wherein the C-plane message comprises section extension information, and wherein the section extension information comprises a constellation shift flag (csf) set to one (1).

9. A method performed by a radio unit (RU) comprising:

receiving a user plane (U-plane) message including U-plane data from a distributed unit (DU) through a fronthaul interface; and obtaining, based on a shifting operation corresponding to a modulation compression scheme, a modulation value corresponding to U-plane data, wherein in case of the modulation compression scheme being binary phase shift keying (BPSK), the shifting operation is performed based on a first equation, and wherein in case of the modulation compression scheme being any one of schemes other than BPSK, the shifting operation is performed based on a second equation different from the first equation, wherein the U-plane data includes a hexadecimal (HEX) value, wherein the HEX value is converted to a shifting value, wherein the shifting value is converted to the modulation value based on the shifting operation, and wherein the modulation value, the shifting value, and the HEX value are set to integers.

10. The method of claim 9, wherein the first equation is set to Y=X, wherein the second equation is set to Y=2X+1, wherein X is the shifting value, and wherein Y is the modulation value.

11. The method of claim 9, wherein the modulation value is obtained without scaling, based on information bits.

12. The method of claim 9, further comprising:

receiving information indicating how to perform the shifting operation through a control plane (C-plane) message, wherein the C-plane message comprises section extension information, and wherein the section extension information comprises a constellation shift flag (csf) set to one (1).

13. An electronic device comprising:

at least one transceiver comprising a fronthaul transceiver; and at least one processor coupled with the at least one transceiver, wherein the at least one processor is configured to:

receive, through a fronthaul interface, a user plane (U-plane) message comprising U-plane data from a distributed unit (DU); and obtain, based on a shifting operation corresponding to a modulation compression scheme, a modulation value corresponding to U-plane data, wherein, in case of the modulation compression scheme being binary phase shift keying (BPSK), the modulation compression scheme is performed based on a first equation, wherein, in case of the modulation compression scheme being any one of schemes other than the BPSK, the modulation compression scheme is performed based on a second equation different from the first equation, wherein the U-plane data includes a hexadecimal (HEX) value, wherein the HEX value is converted to a shifting value, wherein the shifting value is converted to the modulation value based on the shifting operation, and wherein the modulation value, the shifting value, and the HEX value are set to integers.

14. The electronic device of claim 13, wherein the first equation is set to Y=X, wherein the second equation is set to Y=2X+1, wherein X is the shifting value, and wherein Y is the modulation value.

15. The electronic device of claim 13, wherein the modulation value is obtained without scaling, based on information bits.

16. The electronic device of claim 13, wherein the at least one processor is further configured to receive, through a control plane (C-plane) message, information indicating how to perform the shifting operation, wherein the C-plane message comprises section extension information, and wherein the section extension information comprises a constellation shift flag (csf) that is set to one (1).

* * * * *